(12) United States Patent
Machii et al.

(10) Patent No.: US 6,202,925 B1
(45) Date of Patent: Mar. 20, 2001

(54) SYSTEM FOR MANAGEMENT OF OBJECT CARRYING

(75) Inventors: Kimiyoshi Machii; Toshifumi Arai, both of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/148,324

(22) Filed: Sep. 4, 1998

(30) Foreign Application Priority Data

Sep. 5, 1997 (JP) .................................................. 9-240645

(51) Int. Cl.[7] .................................................. G06K 5/00
(52) U.S. Cl. ........................................... 235/380; 235/487
(58) Field of Search .................................. 235/492, 380, 235/382, 382.5, 487, 385

(56) References Cited

U.S. PATENT DOCUMENTS

| | | | | |
|---|---|---|---|---|
| 4,812,634 | * | 3/1989 | Ohta et al. ............................ | 235/492 |
| 5,821,983 | * | 10/1998 | Weiss ..................................... | 348/14 |
| 5,942,738 | * | 8/1999 | Cesaire et al. ........................ | 235/380 |
| 5,955,961 | * | 9/1999 | Wallerstein ....................... | 235/380 X |
| 6,003,776 | * | 12/1999 | Drupsteen ............................ | 235/492 |
| 6,005,962 | * | 12/1999 | Hirota et al. ......................... | 382/124 |

FOREIGN PATENT DOCUMENTS

| | | |
|---|---|---|
| 7-81725 | 3/1995 | (JP) . |
| 7-85145 | 3/1995 | (JP) . |

OTHER PUBLICATIONS

R. Want, et al, Active Badges and Personal Interactive Computing Objects, IEEE Transactions on Consumer Electronics, Feb. 1992, vol. 38, No. 1, pp. 10–20.

* cited by examiner

Primary Examiner—Karl D. Frech
(74) Attorney, Agent, or Firm—Antonelli, Terry, Stout & Kraus, LLP

(57) ABSTRACT

A system for management of object carrying includes a plurality of reading devices for reading information stored in a card given to an object to be managed, a storage device for storing processing contents for situations, a condition setting unit for setting processing to be executed according to a situation, a state monitor unit for executing processing on the basis of information read from one of the reading devices and the contents set by the condition setting unit, a management unit for managing identification numbers each stored in the card for managing the object to be managed, and a display for informing of processing executed by the state monitor unit.

19 Claims, 24 Drawing Sheets

FIG.6

```
┌─────────────────────────────────────────┐
│ ─  │  ACTUAL OBJECT INFORMATION EDITOR  │──601
├─────────────────────────────────────────┤
│  NAME         [ GUIDE BOOK │         ]──602
│  OWNER        [ A.B.                ▼]──603
│  CREATION DATE
│  AND HOUR     [ 1997.5.15  22 : 25   ]──604
│  PLACE        [                      ]──605
│  COMMENT
│               [                      ]
│               [                      ]──606
│
│      607──( OK )      (CANCEL)──608
└─────────────────────────────────────────┘
```

FIG.7

```
┌─────────────────────────────────────────┐
│ ─  │  ACTUAL OBJECT INFORMATION EDITOR  │
├─────────────────────────────────────────┤
│  NAME         [ GUIDE BOOK │         ]
│  OWNER        [ A.B.                ▼]──702
│  CREATION DATE  ┌──────────────────┬─┐
│  AND HOUR   [19│ LABOR SECTION    │▲│
│                │ GENERAL AFFAIRS  │ │
│  PLACE      [  │ DEPARTMENT       │ │
│                │ KANTO BRANCH     │ │
│  COMMENT       │ AB INC.          │▼│
│             [  └──────────────────┴─┘
│                              701
│          ( OK )      (CANCEL)
└─────────────────────────────────────────┘
```

FIG.24A

| ID | 1 | 2 | 3 | 4 | 5 | 6 | 7 | 8 | 9 | 10 | 11 |
|----|---|---|---|---|---|---|---|---|---|----|----|
| 1  |   |   | 10|   |   |   |   |   |   |    |    |
| 2  |   |   |   |   |   |   |   |   | 3 |    |    |
| 3  | 10|   |   |   | 5 |   |   |   | 3 |    |    |
| 4  |   |   | 5 |   |   |   |   |   |   |    |    |
| 5  |   |   |   |   |   |   | 15|   | 6 |    |    |
| 6  |   |   |   |   |   |   |   |   |   |    | 2  |
| 7  |   | 3 |   |   | 15|   |   |   |   |    |    |
| 8  |   |   |   |   |   |   |   |   |   | 1  |    |
| 9  |   |   | 3 |   | 6 |   |   |   |   |    |    |
| 10 |   |   |   |   |   |   |   | 1 |   |    |    |
| 11 |   |   |   |   | 2 |   |   |   |   |    |    |

FIG.24B

| TIME | DATE | TIME |
|------|------|------|
| 1    | 4/20 | 15:00|
| 2    | 4/30 | 16:50|

FIG.27A
FIG.27B
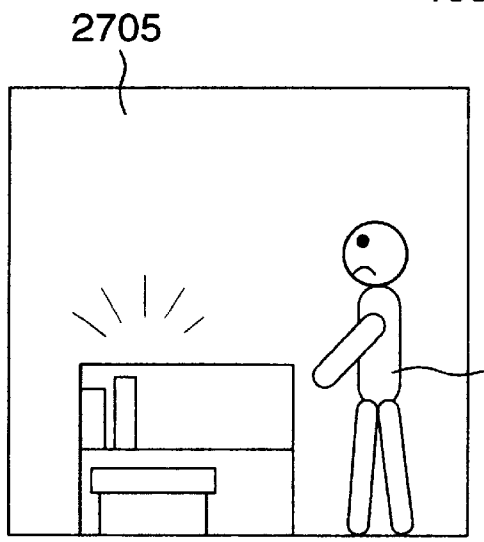
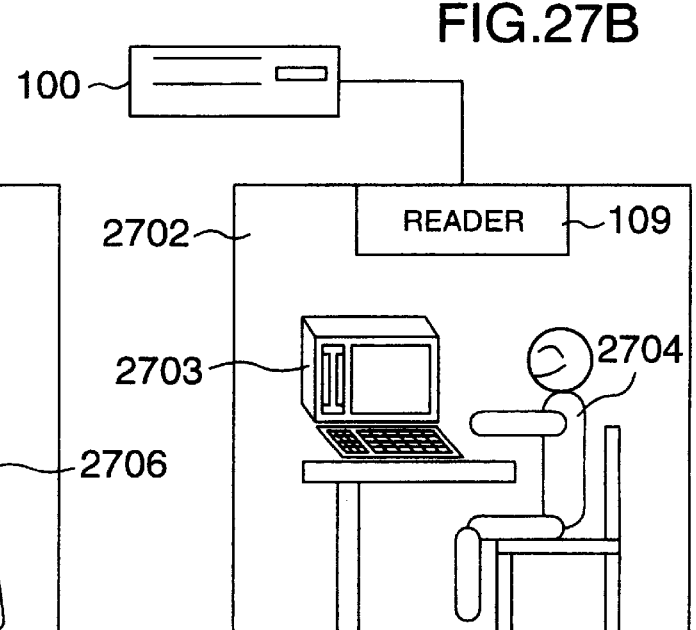

SYSTEM FOR MANAGEMENT OF OBJECT CARRYING

BACKGROUND OF THE INVENTION

The present invention relates to a computer system using a situation change of an actual world.

In "Active Badges and Personal Interactive Computing Objects" of Olivetti Research Limited Technical Report 92-2, there is described system of Active Badges in which persons are made to wear badges and sensors for reading identification numbers of the badges are disposed in respective rooms. From the badge a person wears, an infrared ray signal containing a unique ID number is issued. The signal is read by a sensor. It becomes thus possible to know where the person wearing that badge is.

Furthermore, in JP-A-7-81725, there is disclosed a system for managing the stock of objects in a warehouse or the like. In this system, management of objects deposited in or withdrawn from a warehouse is conducted by attaching a slip having an ID tag to each object and passing the object near a reader disposed in the warehouse.

Furthermore, in JP-A-7-85145, there is disclosed a whereabouts management system for accurately grasping whereabouts of members of the staff and visitors in an installation. In this system, each of members of the staff in the installation is made to carry a card incorporating an ID tag, and whereabouts of the members of the staff in the installation are managed on the basis of information read from readers installed on telephone lines.

In the above described conventional techniques, however, each of objects or persons is provided with a card or the like having an ID tag in order to manage the object or person. It is considered only to manage objects or persons as simple substances.

In other words, it is necessary for a person managing objects to manage information concerning the objects, such as contents of the objects, as well as the whereabouts representing where the objects are. Furthermore, when it is attempted to carry out these objects from a warehouse, it is insufficient to simply manage the movement of objects. For example, management cannot be conducted, when an object is carried out from a warehouse. Two distinguishing cases can occur in this situation; one case where a warehouse owner or an object owner carries out the object and the other case where a person having no connection with this object carries out the object, by simply attaching an ID tag to the object.

Furthermore, in the case where objects are managed to a higher degree, a system for managing objects cannot be operated unless ID tags to be given to objects or persons are issued efficiently.

SUMMARY OF THE INVENTION

In view of the above described problems, the present invention has been made. An object of the present invention is to provide an object management system for managing objects to a higher degree by combining objects with information concerning the objects.

The above described object can be achieved by including a reading device capable of reading information stored in a card without contacting the card, a storage device, an input device for inputting information of an object to be managed and information concerning the object, a processing device for causing a new identification number to be generated, storing the information of the object to be managed and the information concerning the object input from the input device in the storage device so as to be associated with each other, and reading the information of a related object from the storage device on the basis of an identification number read from the reading device, a card issue device for storing the new identifying number in a card, and a display device for displaying the information relating to the object read out from the storage device.

Furthermore, the above described object can be achieved by including a plurality of reading devices for reading information stored in a card given to an object to be managed, a storage device for storing processing contents for situations, a condition setting unit for setting processing to be executed according to a situation, a state monitor unit for executing processing on the basis of information read from one of the reading devices and the contents set by the condition setting unit, a management unit for managing identification numbers each stored in the card for managing the object to be managed, and display means for informing of processing executed by the state monitor unit.

According to the invention, it becomes possible to search an actual object by using the surrounding situation around the actual object or a person as a key.

BRIEF DESCRIPTION OF THE DRAWINGS

FIG. 6 shows an editor for inputting related information of an actual object.

FIG. 7 shows a method for inputting an owner of an actual object.

FIGS. 24A and 24B show history of simultaneous detection of an object and another object.

FIGS. 27A and 27B show an example of a scene in which the present invention is needed.

DESCRIPTION OF THE PREFERRED EMBODIMENTS

Embodiments of the present invention will be hereafter described by referring to drawings. The present invention aims at managing actual objects and starting suitable computer processing by using situations surrounding the actual objects. A situation surrounding an actual object is represented by a combination of a person existing near the actual object, a place where the actual object is present, and date and hour at that time. In other words, actual objects are managed on the basis of history of access to the objects and history of movement of the actual objects. Furthermore, making it possible to search for information concerning the actual object is also one of the objects of the invention. For example, it is made possible to search for "a word processor which was used by Mr. AA in an office room yesterday."

Figure 1:
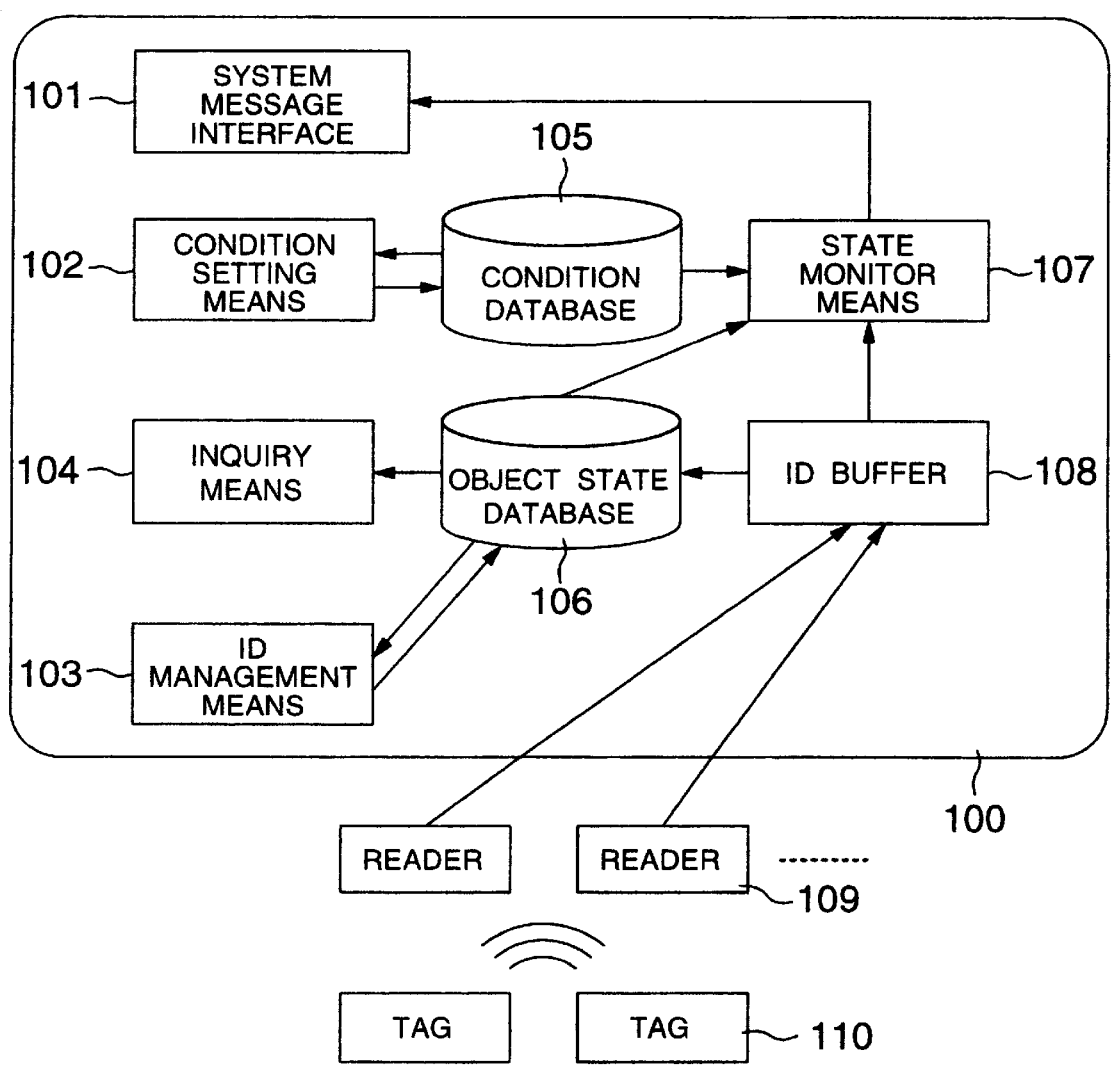
FIG. 1 shows a configuration of the present invention.

FIG. 1 shows the entire configuration of an object management system. In FIG. 1, each of the arrows indicates a data stream. To each of the actually existing objects, a tag 110 is attached (stuck). Information of the tag 110 is read by a reader 109. Not only the actual objects but also men carry the tags 110 in some cases. When information of the tag 110 is read, the tag 110 does not necessarily need to come in contact with the reader 110. The tag 110 stores at least an ID number. There are not a plurality of tags having the same ID number. By reading the ID number stored in the tag 110, therefore, it becomes possible to know what is the actual object having the tag attached (stuck) thereto.

The readers 109 are installed in a plurality of arbitrary places of the actual world. The readers 109 are also provided with ID numbers. In the same way as the tags 110, there are not a plurality of readers having the same ID number. If the ID number of a reader 109 is known when a tag 110 is read by the reader 110, the place where the tag has been read is known.

As heretofore described, tags 110 are attached (stuck) to all actual objects and readers 109 are installed in all places. If only a person carries an actual object having a tag 110 attached (stuck) thereto and approaches a place where a reader 109 is installed, information concerning the actual object can be obtained.

If the information of the tag 110 is read, that information is sent to a host computer 100. Upon receiving the information, the host computer 100 starts the processing. Operation of the host computer 100 will now be described.

If the information of the tag 110 is read, the information is temporarily stored in an ID buffer 108. At the same time, the ID number of the reader which has read the information is also stored in the ID buffer 108. These kinds of information are stored in an object state data base 106, and simultaneously sent to state monitor means 107.

In the object state data base 106, information concerning an actual object having a tag 110 attached thereto or information concerning the place where a reader 109 is installed is stored in association with an ID number given to the tag 110 or the reader 109. The information in question means history of that actual object sensed by any reader 109. In other words, it can be regarded as the history of access to the actual object in question.

Figures 10, 11:
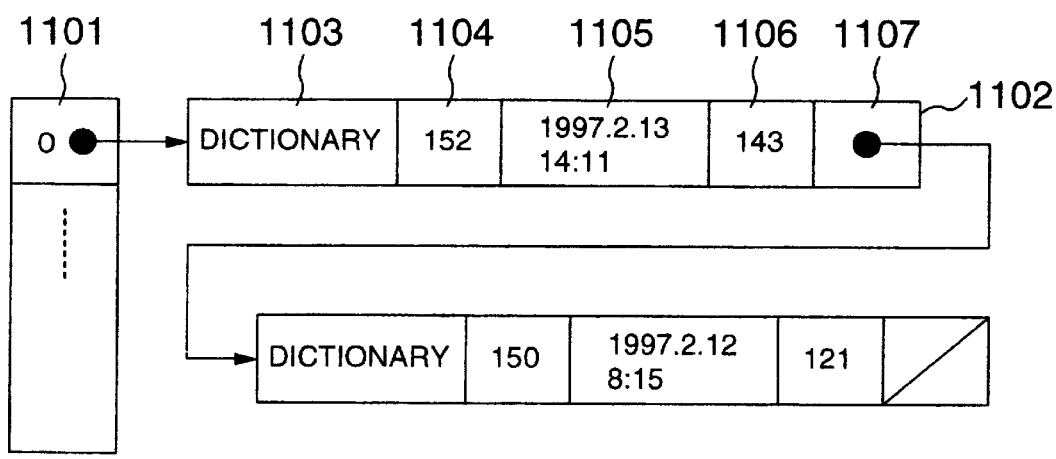
FIG. 10 shows a window for inputting a key to search an actual object.
FIG. 11 shows a data structure of an object state data base.

An example of the data structure of the object state data base 106 is shown in FIG. 11. An ID list 1101 is a pointer to history information 1102 of a sensed actual object having an ID number in question. In the example of FIG. 11, history information of an actual object having the ID number 0 is shown. The history information 1102 is formed by an object name 1103, a place ID 1104, a date and hour 1105, a "With" 1106, and a preceding history event 1107. The object name 1103 indicates the name of the actual object in question. The place ID 1104 indicates the ID of the place where the actual object in question was sensed. Alternatively, the place ID 1104 may indicate the place name. The date and hour 1105 indicates the date and hour when the actual object was sensed. The "With" 1106 indicates the ID number of an actual object sensed together with the actual object in question. In the example of FIG. 11, only one ID number is illustrated. However, it is also considerable that the actual object is sensed together with a plurality of actual objects. Therefore, it is necessary to secure, in the "With" 1106, such a storage area as to store a plurality of ID numbers. The preceding history event 1107 is a pointer to the history event in which the actual object in question was sensed prior to that. By doing so, history events are arranged in order of newness. Alternatively, the history events may be arranged in order of oldness. In this case, however, it is necessary to consider that it takes a time to search for history information having a preceding history event 1107 (a pointer to the next history event in this case) set to "null", when adding new history information 1102.

On the other hand, the state monitor means 107 receives information of the tag 110 and the information of the reader 109 which has read that information, and judges the situation around the actual object. At the same time, the state monitor means 107 determines whether it is necessary to start processing, according to the situation. For this determination, a condition data base 105 is used. In the condition data base 105, processing contents are described in association with surrounding situations. Details of the condition data base 105 will be described later. When the state monitor means 107 has determined that the processing should be started, it starts suitable processing and displays a result of processing on a system message interface 101.

Heretofore, operation of the system has been mainly described. The interface between the system and the user will now be described. As the interface between the system and the user, condition setting means 102, ID management means 103, and inquiry means 104 are provided. Each of them will now be described in brief, and details will be described later.

The condition setting means 102 is a user interface for the user to set processing to be started, according to the surrounding situation. The ID management means 103 issues an ID number for a tag 110. When an ID number has become unnecessary, the ID management means invalidates that ID number. When a tag 110 has become unusable because of loss, a failure, or the like, the ID management means 103 reissues an ID number. The inquiry means 104 is a user interface for inquiring of the system about the state of an object. The inquiry means 104 is a user interface for inquiring about the surrounding situation of an actual object, such as, for example, where the object is, who has the object, and when the object was carried out.

In the present invention, it becomes possible to conduct operation not only by input using conventional computer interfaces, i.e., dedicated devices such as a keyboard and a mouse, but also by a condition of a combination of an object and a person, and furthermore information of date and hour or time. As compared with the conventional computer interface, therefore, more intuitive computer manipulation becomes possible.

Figure 3:
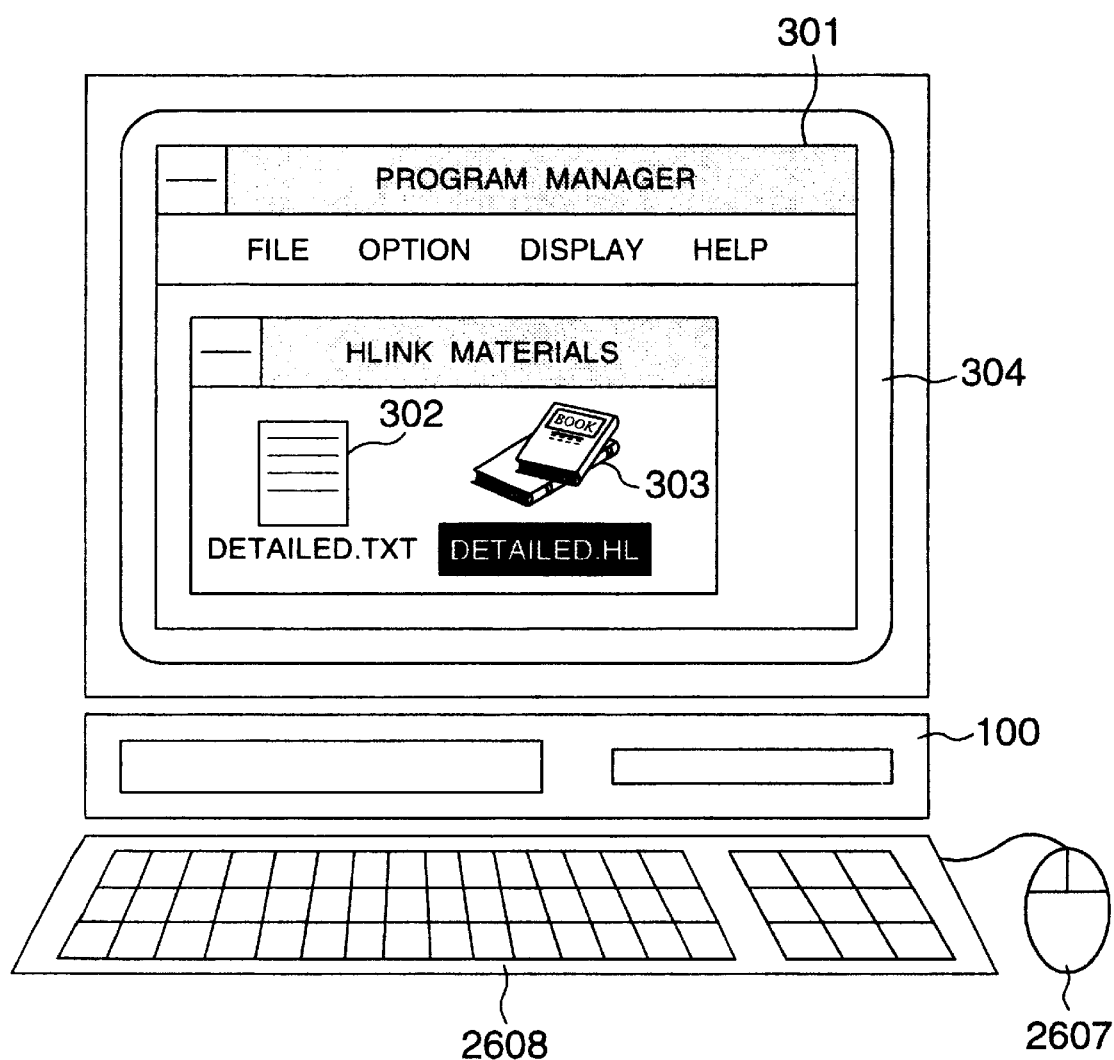
FIG. 3 shows a main screen in a computer implementing the present invention.

FIG. 3 shows a general view of a system implementing the present invention. There is not a difference between this and the configuration of a general purpose personal computer. In other words, the system is formed by a display 304, a host computer 100, a keyboard 2608, and a mouse 2607. Although not illustrated in FIG. 3, a plurality of readers 109 are connected to the host computer 100.

On the display 304, a window 301 appearing first when manipulating the host computer 100 is displayed. The window 301 is a main window in the conventional window system. By manipulating the window 301 by using the keyboard 2608 and the mouse 2607, the user can inquire about information concerning an actual object. For example, in the case where a certain actual object is looked for, the window 301 displays where the actual object in question is.

In the conventional window system, an electronic file is represented by an icon. By double-clicking the icon with the mouse or the like, the electronic file is opened. In the present invention, it is made possible for the computer to handle not only electronic files generated by the computer but also actual objects existing in the world located outside the computer. In the window 301, an actual object icon 303 representing an actual object existing in the world located outside the computer is displayed beside an icon 302 representing a text file generated by the computer. In the conventional window system, double-clicking the icon 302 opens the file represented by the icon. In the same way, in response to double-clicking the actual object icon 303, information relating to the actual object represented by the icon is displayed. For example, information such as where the actual object is at the present time and who is using the object can be obtained. In other words, it becomes possible to handle with the same interface, the actual object existing in the world located outside the computer as well as the electronic file generated on the computer.

As the icon, a photograph of the actual object or a person represented by the icon may be used instead of a picture. By doing so, the user can intuitively understand what actual object is represented by the icon.

Furthermore, besides the icons representing an object and a person, an icon representing a place may be used. By double-clicking the icon representing a place, a layout diagram of the place appears. By specifying a certain place (for example, by clicking a place where a cabinet has been installed), an icon of an actual object kept in that place appears. This will be described later.

Figure 2A:
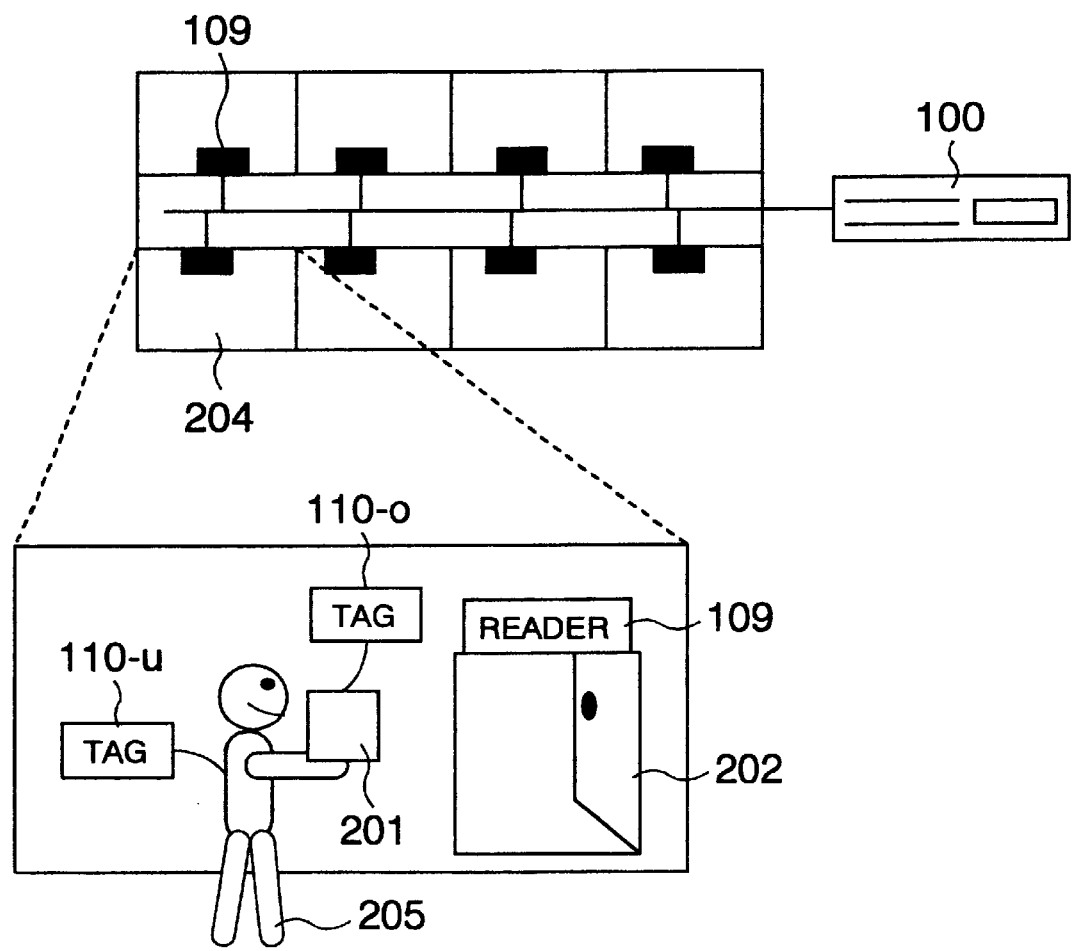
FIGS. 2A and 2B show an example of application of the present invention.
Figure 2B:
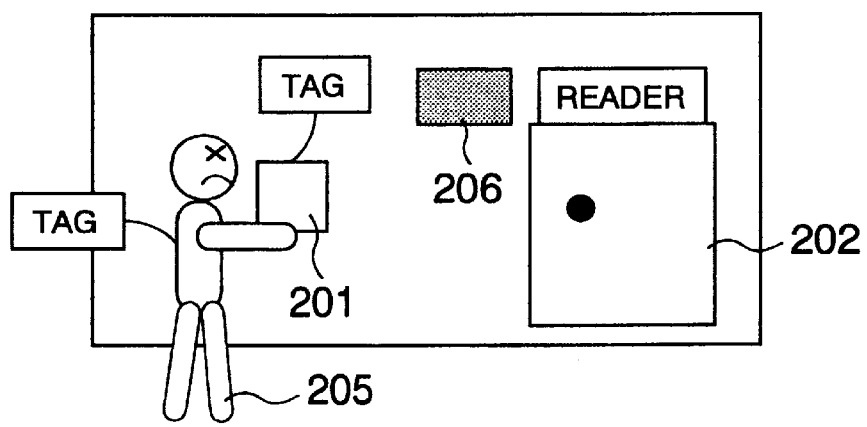

Management of objects provided by this system will now be described by referring to FIGS. 2A and 2B. FIGS. 2A and 2B show an example of carrying out actual objects kept in respective rooms. At an entrance and exit 202 of each room, a reader 109 is disposed. All readers 109 of rooms are connected to the host computer 100 (FIG. 2A). As described above, each of the readers 109 is provided with a unique ID number. The host computer 100 has components as shown in FIG. 1.

When a user 205 is going to exit a room 204 through the entrance and exit 202 while carrying an object 201, the reader 109 installed near the entrance and exit 202 reads a tag 110-o attached to the object 201 and a tag 110-u carried by the user 205, and transmits data contained in the tag thus read and the ID number of itself to the host computer 100. Upon receiving the data, the host computer 100 stores information indicating that "the user 205 accessed the object 201 in the room 204" in the object state database 106. At the same time, the host computer judges processing to be started by referring to the state monitor means 107. In the case where it has been found as a result that the user 205 cannot carry out the object 201 from the room 204, the host computer 100 locks, for example, the entrance and exit 202 to prevent the user 205 from going out of the room 204 (FIG. 2B). At the same time, a voice message "you should not carry it out" may be issued from a speaker 206 installed near the entrance and exit 202. Furthermore, the above described message may be displayed by using a display instead of the speaker 206, or an alarm light may be used. These can be used in combination. These devices can be used as the system message interface 101.

The example shown in FIGS. 2A and 2B can be applied to management of object lending and the like. For example, it is now assumed that the example shown in FIGS. 2A and 2B is applied to the lending management of books in a library. In the prior art, two operations, i.e., authentication of a borrower and identification of a borrowed book were needed. As a result of application of the present invention, however, a record representing who borrowed what book can be left by simple passage of a borrower carrying a book to be borrowed through the entrance and exit. If the book is for reference only, it is possible to prevent the borrower from going out by using the method as described above.

Besides that, conditions of date and hour (such as minute, o'clock, day, and month), and time (minutes from now) can be set. In the above described example, the condition concerning the person allowed to carry out an object has been mentioned. However, it is also possible to set a condition such as "Mr. AA cannot enter the room from   hour to   hour on th ." This can be applied to, for example, place reservations or the like.

A condition of date and hour, or time may be added to the above described example to set a condition such as "a magazine can be carried out provided that it is returned within a day." However, not only the condition at the time when the magazine is carried out but also processing at the time when one day has elapsed come into question. The condition "the magazine can be carried out provided that it is returned within a day" means that "the magazine should be returned if one day has elapsed."

In the case where the magazine is not returned even if one has elapsed, it is necessary to urge the person who carried out the magazine to return it, by some method. Or it is necessary to tempt the person to return the magazine. For example, the entrance and exit may be locked provided that the person does not have a magazine when the person exits the place where magazines are placed. Furthermore, in the case where the person has been able to leave the room with a magazine, the person may be prevented from returning to the original room or from entering other rooms so long as the person returns the magazine.

Hereafter, the case where the present invention has been applied to the management of carrying out and search of an object place will be described in detail. First of all, the user installs readers 109 in respective rooms. On the basis of the position of a reader 109, the position of an actual object existing in that place can be derived. In the case of a management system of carrying out, it is necessary to install a reader 109 at least at the entrance and exit of each room. As a matter of course, readers 109 may be installed in a plurality of positions of each room. For example, a reader 109 may be installed on each file cabinet to manage carrying out a book from the cabinet. Or a reader 109 may be installed on a disk so as to manage carrying out actual objects placed on the table. Here, while narrowing down to carrying out from a room, carrying out from a cabinet, and carrying out from a desk, description will be given.

Furthermore, a reader 109 in question must be associated with an installation position of the reader 109 in question. A method for accomplishing this will also be described.

Figure 19A:
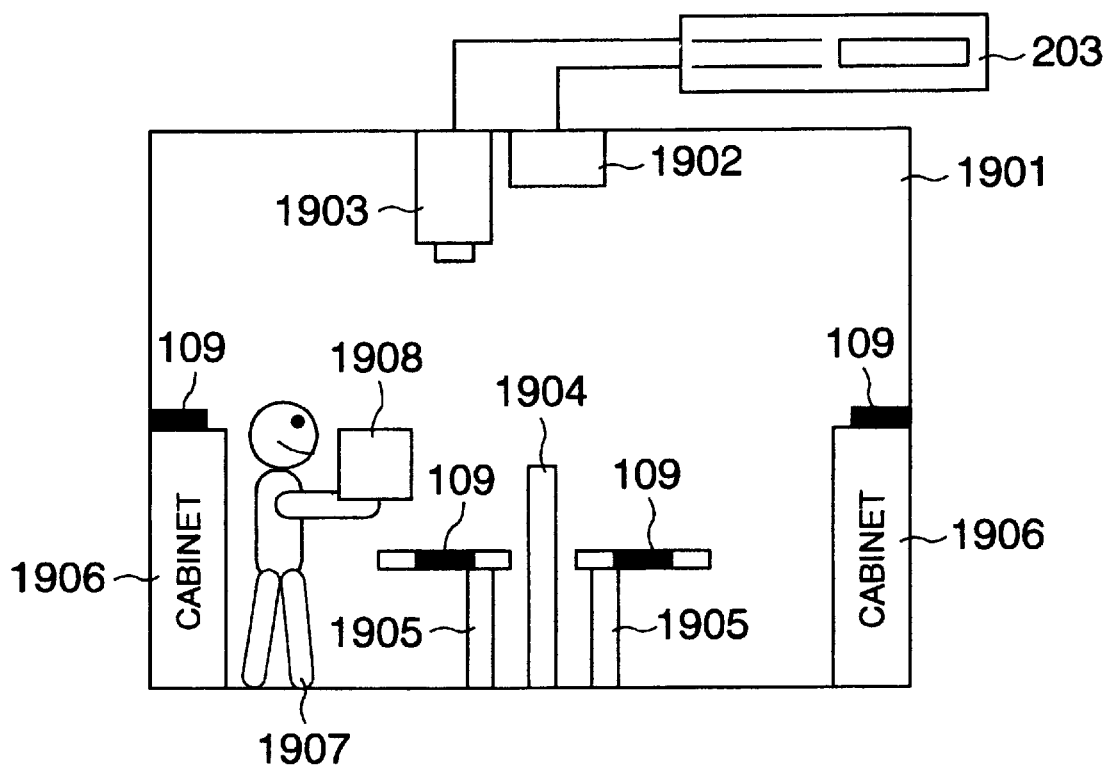
FIGS. 19A and 19B show an example of a method for grasping an installation place of a reader.

FIG. 19A shows a sectional view of a room 1901. At both ends of the room, cabinets 1906 are installed. In the center of the room 1901, desks 1905 and a seat group 1904 are installed. Here, readers 109 are installed in the room 1901.

A user 1907 installs readers 109 in respective positions of the room 1901. It is desirable for the user 1907 to install the readers 109 in positions where actual objects are presumed to be placed. In the example of FIG. 19A, readers 109 are installed on the cabinets 1906, the desks 1905, and the seat group 1904. The readers 109 are connected to the host computer 100. Furthermore, the user 1907 installs a picture input device 1903 and a position detection sending device 1902 on the ceiling of the room 1901. Each of them must be connected to the host computer 100.

When the user has finished installing the readers 109, the user 1907 starts, on the computer 100, reader information management means for managing the reader information, and walks about in the room 1901 while carrying a tag 1908 having a position detection receiving device. The position detection sending device 1902 always measures the position of the tag 1908. If at that time the user 1907 approaches a reader 109, then the reader 109 reads the tag 1908 and transmits its own reader ID to the host computer 100. At the same time, by linking the position of the tag 1908 measured by the position detection sending device 1902 with the reader ID, it is possible to know where which reader is.

Furthermore, the picture input device 1903 installed on the ceiling takes a picture of the inside of the room 1901. By processing the picture thus taken, the shapes of actual objects existing in the room can be known. This is accomplished by, for example, conducting contour extraction of extracted substances.

Figure 19B:
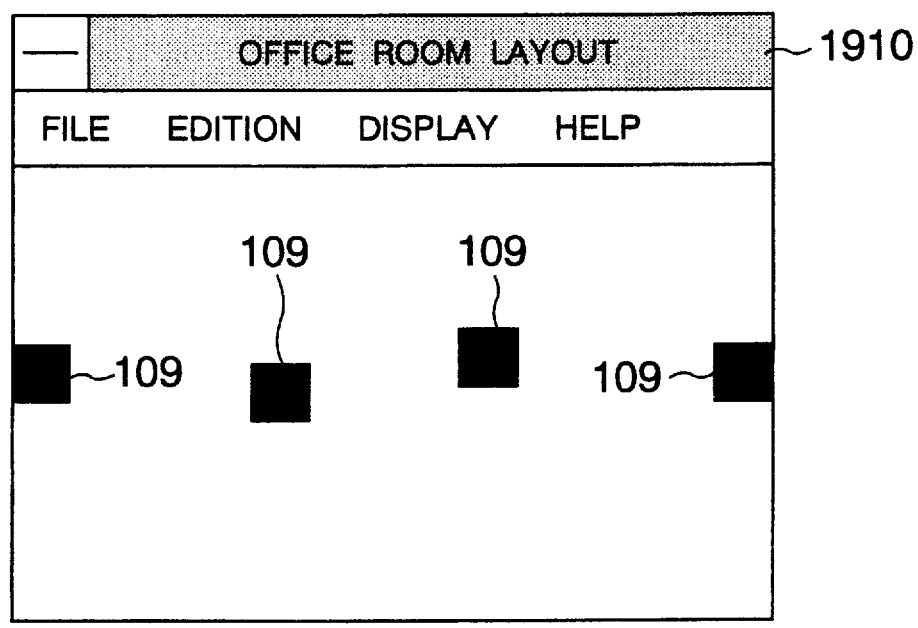

By starting the reader information management means of the host computer 100, a window 1910 as shown in FIG. 19B is opened. The window 1910 shows the top view of the room 1901 and furthermore displays positions of the readers 109.

Figure 20A:
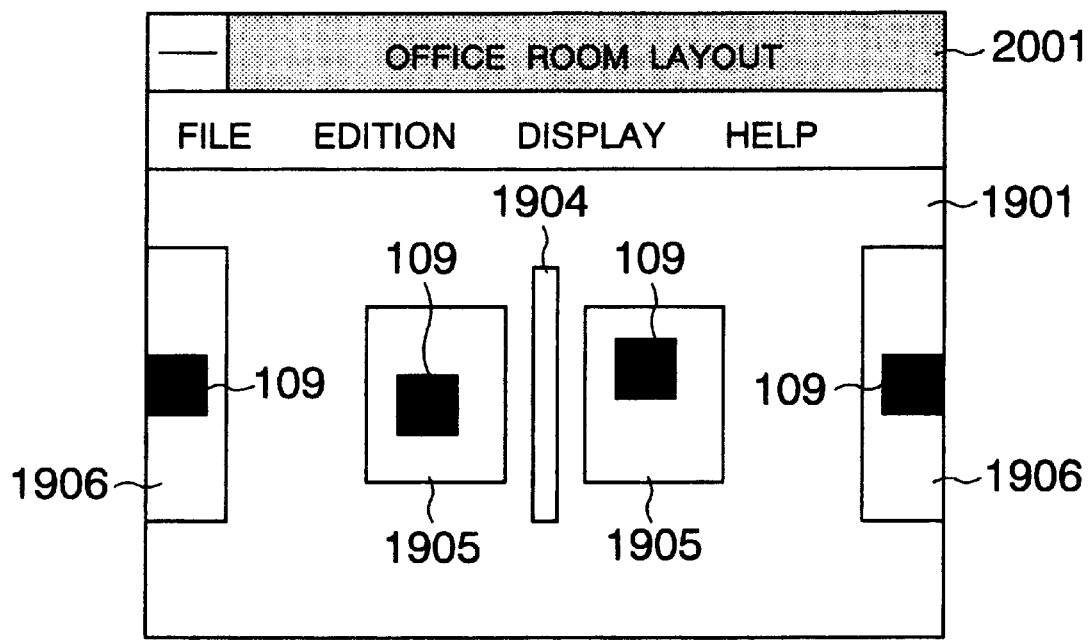
FIGS. 20A and 20B show a window displaying reader positions and real object positions.
Figure 20B:
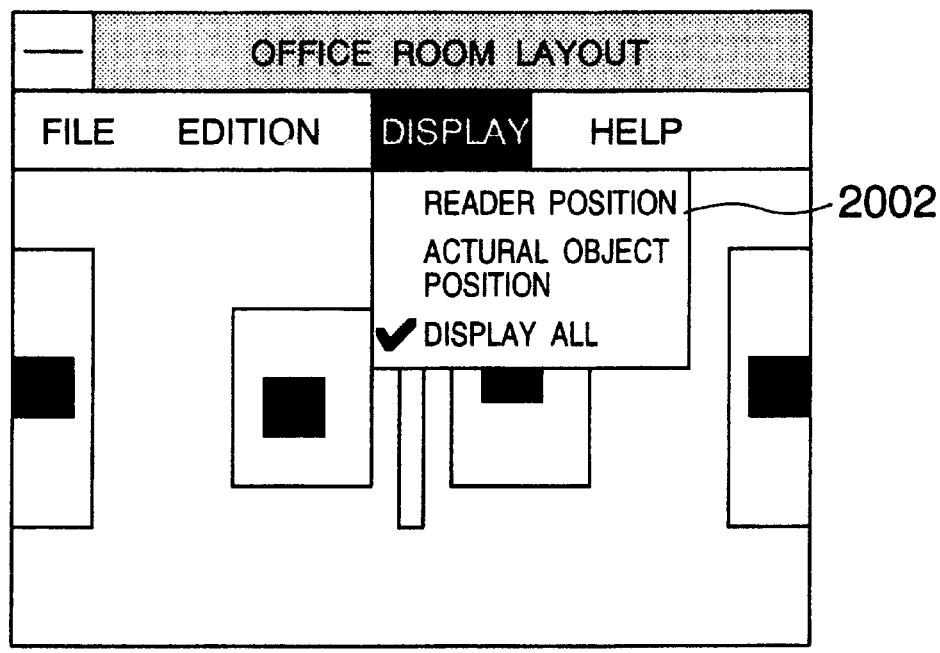

In FIG. 19B, only the positions of the readers 109 are displayed. So as to be superposed on, for example, the window 1910 displaying the positions of the readers 109, positions and shapes of respective actual objects are displayed as shown in FIG. 20A. Contents to be displayed in a window 2001 can be arbitrarily set by using a display menu 2002. By using this display menu 2002, it becomes possible to display only the reader position, only the actual object position, or both of them (FIG. 20B). In the example of FIG. 20B, "Display All" is selected, and consequently both the reader position and the actual object position are displayed.

Figure 21A:
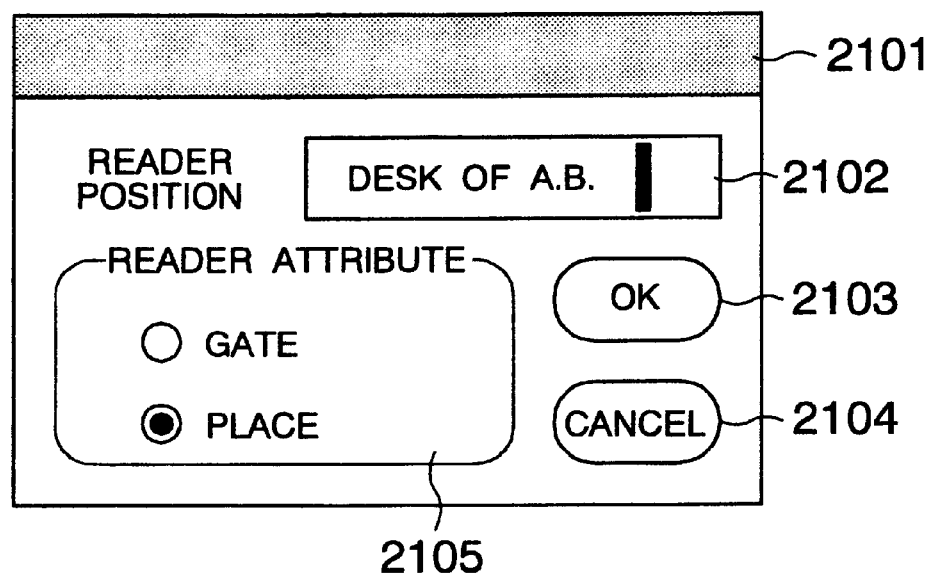
FIGS. 21A and 21B show a window for inputting information concerning a reader.
Figure 21B:
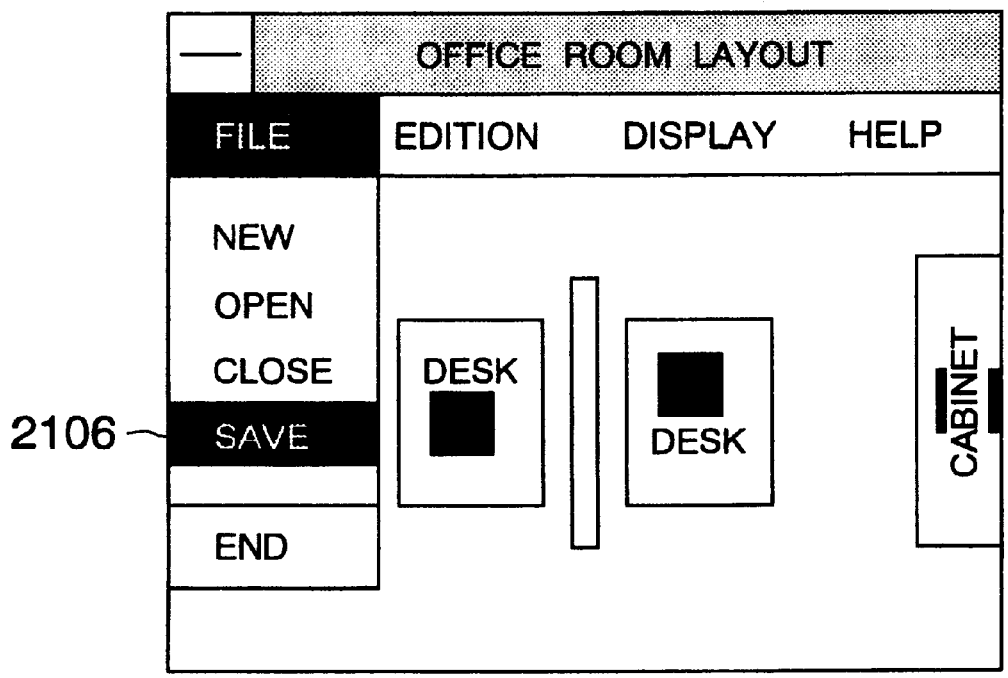

If then a reader position is double-clicked on a window 2001, a window 2101 shown in FIG. 21 appears, and information concerning respective readers 109 can be input. In the window 2101, a position input field 2102 is provided to input a reader position. In an attribute field 2105, the attribute of the reader in question is specified. If information inputting is finished and an "OK" button 2103 is clicked, then setting of the information concerning the reader is finished and the window 2101 disappears. If a "Cancel" button 2104 is clicked, the reader information is not set and the window 2101 disappears. If an actual object position is double-clicked in the window 2001, the actual object position can be provided with a comment by the same method as the foregoing description.

Figure 16:
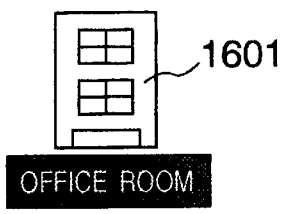
FIG. 16 shows an example of an icon indicating a place.

After the user has finished in information inputting, the user selects a "Save" menu 2106 and stores information such as the reader position and the comment in the object state data base 106. At the same time, a room icon 1601 is generated. In FIG. 16, the room icon 1601 is shown. How to use the room icon 1601 will be described later.

Or the information may be stored in a file, and the file name may be linked with a reader ID. In this case, only the file name and the reader ID are stored in the object state data base 106.

Furthermore, for knowing the position of a reader 109, it is possible to provide the readers 109 with a position detection receiving function, besides the above described method.

Or a picture input device may be attached to the tag 1908 having the position detection receiving device, and a picture of the place where the reader 109 is installed may be saved. If, for example, a cabinet 1708 is clicked in a window 1708 shown in FIG. 17A, therefore, not only an icon representing an actual object stored in the cabinet 1708 is displayed, but also a picture of the cabinet 1708 can be displayed. If only the layout is displayed as in the window 1701, it cannot be said sometimes that it is easy for the user to understand the place. By displaying the picture of that place, however, it becomes easy for the user to understand the place.

Subsequently, the user carries out a procedure for associating a tag 110 appended to (stuck on) an actual object with the actual object in question and the actual object in question. For this purpose, the ID management means 103 is used. Besides storing an ID number in the tag 110 and issuing it, roles of the ID management means 103 include invalidating an ID number of a tag 110 when the issued tag has become unnecessary, and reissuing a substitute tag when an issued tag 110 has become unusable due to a failure, loss or the like. The function of storing an ID number in the tag 110 and issuing it will now be described.

Figure 5A:
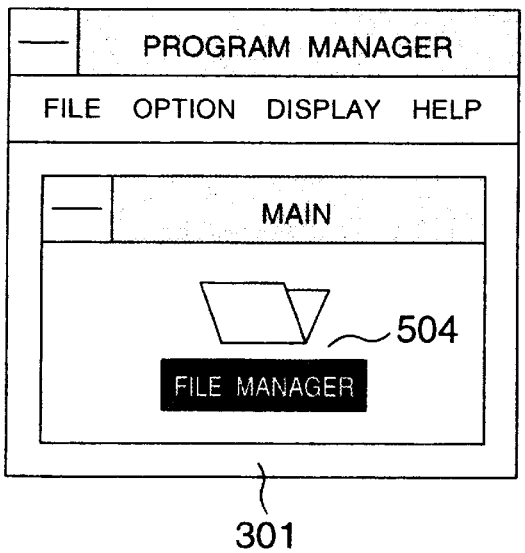
FIGS. 5A–5C show a series of manipulations for issuing an identifier to be given to an actual object.
Figure 5B:
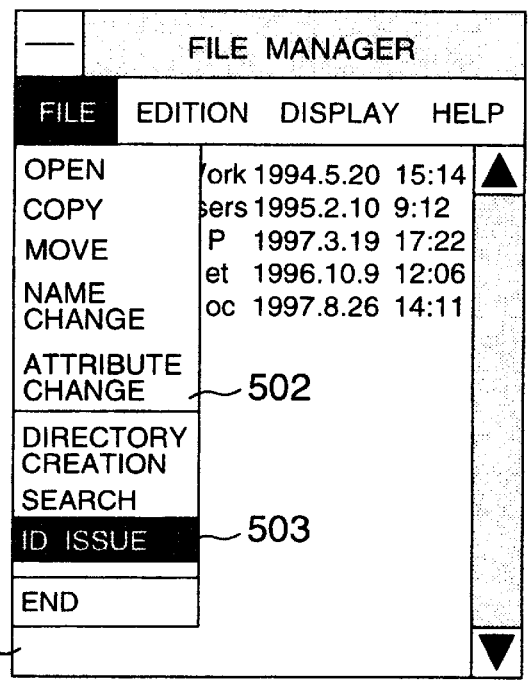

In the window 301 of FIG. 5A, the user double-clicks an icon 504. Thereupon, a window 501 shown in FIG. 5B is displayed on the display 304. The window 501 is a user interface for handling electronic files stored in the host computer 100. In its menus, an item "ID Issue" is provided. By selecting an "ID Issue" menu 503, a tag 110 having an ID number stored therein can be issued. The window 501 has heretofore been provided to erase or copy a file. To this, however, a function for issuing a tag 110 is added.

Figure 5C:
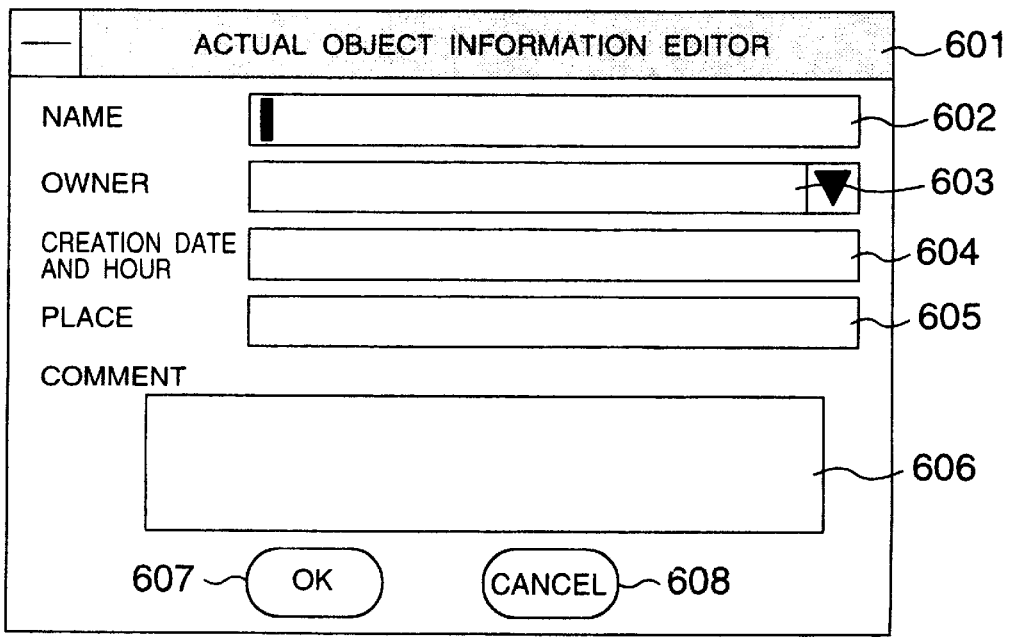

From the window, a menu 502 is displayed, and the "ID Issue" menu 503 is selected. Thereupon, a window 601 shown in FIG. 5C appears. In the window 601, a field for inputting information concerning an actual object is provided. From the window 601, the user can input information concerning an actual object. A name field 602 is a field for inputting the name of an actual object. An owner field 603 is a field for inputting an owner of an actual object. A date and hour field 604 is a field for inputting the current date and hour. A place field 605 is a field for inputting the place where the inputting person is at present. A comment field 606 is a field for inputting a comment concerning an actual object. It is not always necessary to input a comment to the comment field 606, but the comment field may be blank.

As for the owner field 603, it is also possible to read the data of a tag 110-u carried by the inputting person and automatically input the name and post of the person. By thus automatically inputting the name and post of the person without depending upon intentional input conducted by the user, the trouble for inputting the owner is saved and input errors are not caused. In the owner field 603, a person's name is not necessarily input. It is also possible to input a name of an organization to which the person belongs. This will be described later. If the host computer measures time, the host computer 100 can automatically display the creation date and hour after the window 601 has appeared without user's input. Not only information concerning the actual object is input in the form of a text, but also a picture input device for inputting the picture of the actual object in question may be provided.

When all required information has been input, the user clicks an "OK" button 607 (FIG. 6). The host computer 100 selects one out of free ID numbers, and issues a tag 110 having that ID number. At the same time, the host computer 100 links input information with the ID number. The input information is stored in the object state data base 106. Alternatively, the information is stored in one electronic file, and the electronic file is linked with the ID number. In this case, the electronic file name is stored in the object state data base 106, instead of the information. In the case where the processing is desired to be finished without issuing a tag, the user clicks a "Cancel" button 608.

FIG. 7 shows input of the owner field 603. If a button 702 located at the right end of the owner field 603 is clicked, the post of the inputting person appears in a post field 701. The post of the person is not restricted to one. The post of a person is represented as, for example, "Mr. BA belongs to labor section, general affairs department, Kanto branch office, AB Inc." as shown in a post field 701. Even if an object is owned by the person, it is considered that the object is owned by the labor section, the general affairs department, Kanto branch office, or AB Inc. Therefore, it is necessary to specify who owns the object.

By specifying this, it becomes possible to permit not only the person but also the organization to which the person belongs to access the object. For example, it becomes possible to permit a person of the labor section to use the object, or permit a person of the general affairs department to carry out the object.

Figure 13:
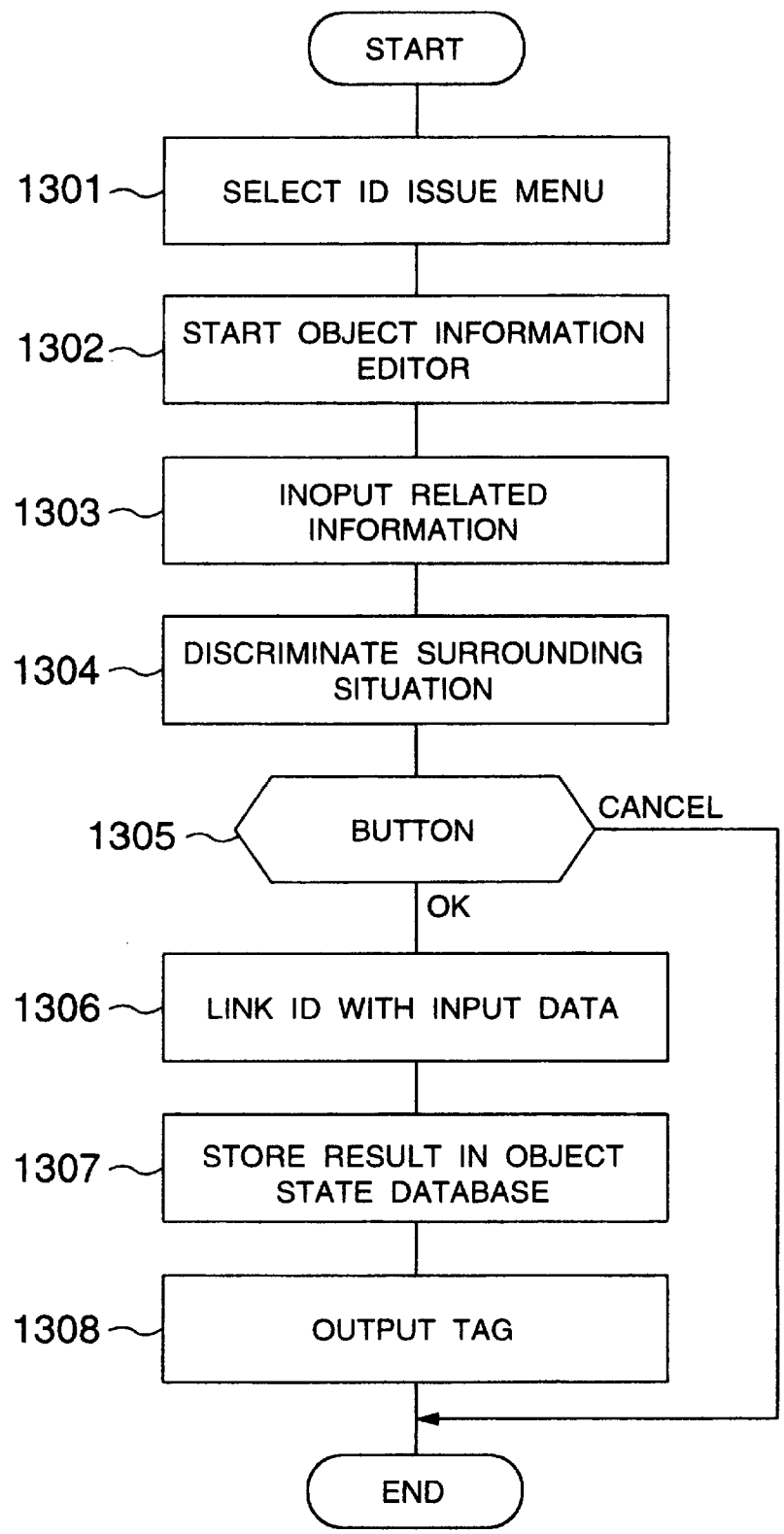
FIG. 13 is a flow chart showing a procedure for issuing an identifier to be given to an actual object.

The procedure of tag issue heretofore described is shown in FIG. 13 and will be described again. The user selects a tag issue menu 503 of the window 501 (Step 1301), and starts the actual object information editor 601 (Step 1302). By using the actual object information editor 601, the user inputs the name of an actual object and so on (Step 1303). During that time, a reader 109 provided for the host computer 100 reads the information of a tag 110 carried by the user and discriminates the situation around the actual object (Step 1304). When the user has finished in inputting the related information, the user clicks the "OK" button 607 or the "Cancel" button 608 (Step 1305). If the "Cancel" button 608 is clicked, the processing is finished without issuing a tag. If the "OK" button 607 is clicked, then the host computer 100 searches for one unused ID number, links information input from the actual object information editor 601 with the information of the surrounding situation around the actual object and the ID number (Step 1306), and stores the result in the object state data base 106 (Step 1307). Finally, the host computer 110 outputs a tag 110 provided with the ID number (Step 1308).

Figure 26:
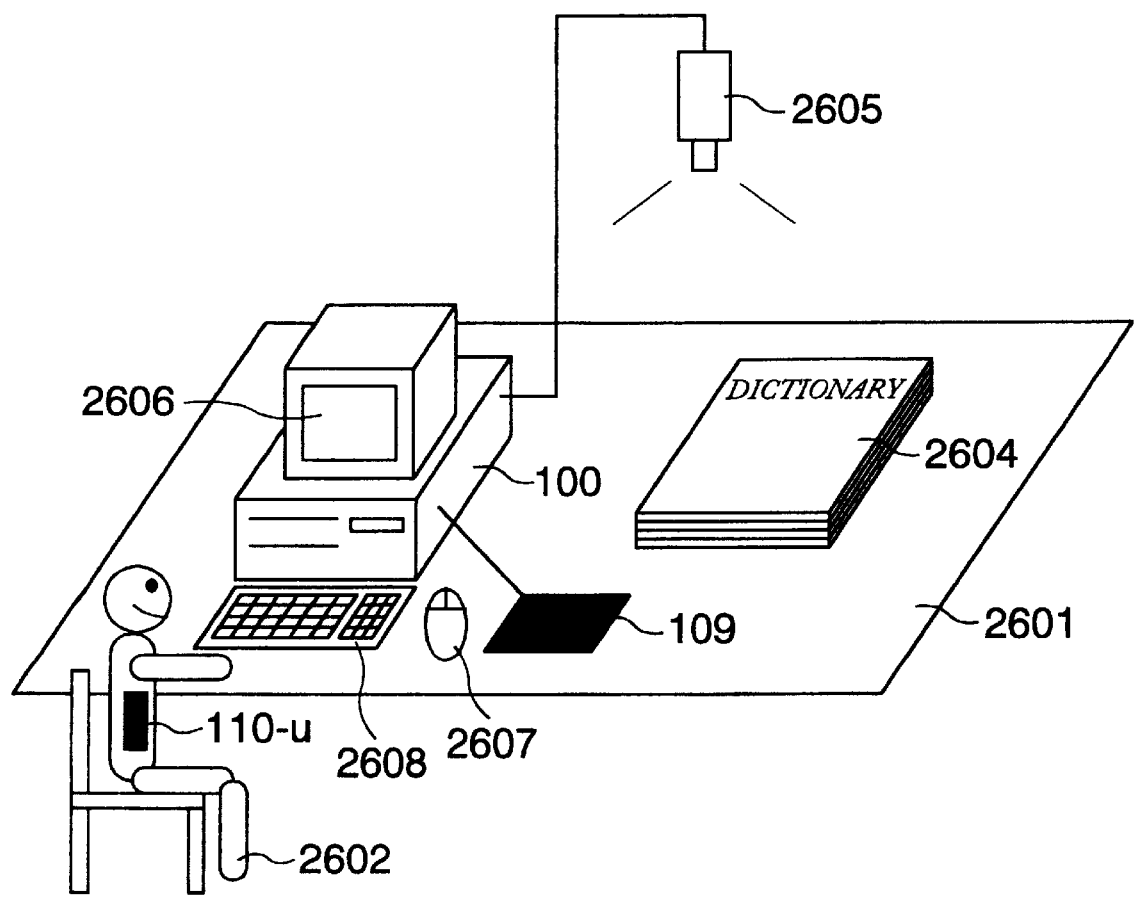
FIG. 26 shows a scene of issuing an identifier to be given to an actual object.

FIG. 26 shows an example of an environment for issuing a tag 110. On a desk 2601, a reader 109 is installed. The reader 109 is connected to a personal computer 100. A user 2602 carries a tag 110-u. In the tag 110-u, at least an ID number is stored. This ID number does not overlap with the ID number of any other tag. Over the head of the user 2602, a picture input device 2605 is installed to take a picture of the state on the desk 2601.

It is now assumed that the user 2602 is about to issue a tag 110 to be attached to a dictionary 2604 placed on the desk 2601. On a display 2606, the actual object information editor 601 is displayed. By using a keyboard 2608 and a mouse 2607, the user 2602 inputs information concerning the dictionary 2604. The picture input device 2605 takes a picture of the dictionary 2604, and stores the picture temporarily in a buffer included in the personal computer 100.

In the middle course of the manipulation conducted by the user 2602 to issue a tag 110, the reader 109 reads information of the tag 110-u. As a result, the personal computer 2603 can determine the person who is about to issue a tag 110. That information is stored temporarily in a buffer included in the personal computer 100.

The user finishes in inputting the necessary information by using the actual object information editor 601, and clicks the "OK" button 607. Thereupon, the personal computer 100 links the picture of the dictionary 2604 with the information of the person conducting the inputting manipulation and the information input from the actual object information editor 601, further links the ID number of the tag 110 with those kinds of information, and stores a result in the object state data base 106. Besides information intentionally input by the user 2602 by using the keyboard 2608 and the mouse 2607, the surrounding situation around the actual object at the time when issuing the tag 110 can also be thus stored in the object state data base 106 so as to be linked with the information. By doing so, it becomes possible to use not only the information input by the user 2602 but also the surrounding situation around the actual object at the time when the tag 110 was issued, as a key for searching for an actual object.

Furthermore, the picture input device 2605 may be integral with the reader 109.

Figure 8:
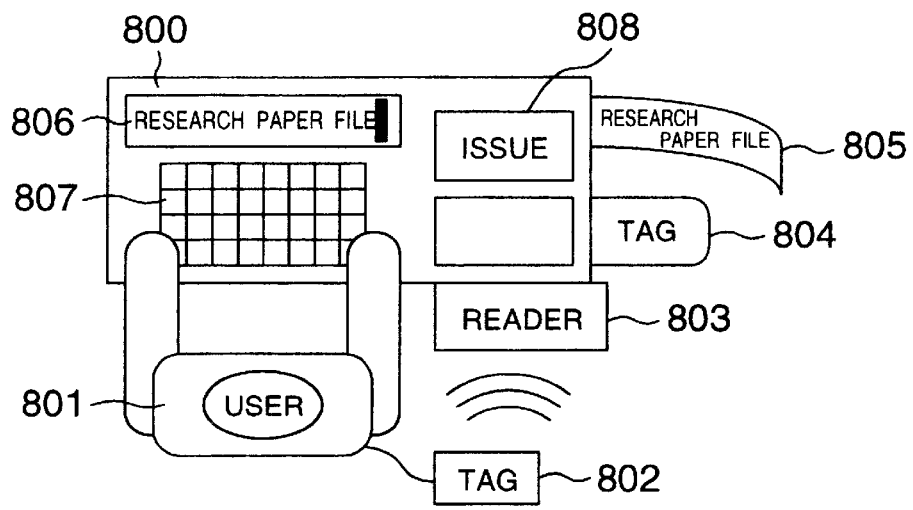
FIG. 8 shows a scene of issuing an identifier to be given to an actual object.

As shown in FIG. 8, the tag issue can be applied to a label word processor as well.

FIG. 8 shows a scene in which the user 801 creates a label 805 by using a label word processor 800. The user 801 carries a tag 802. In the tag 802, an ID number and information concerning the user 801 are stored. For example, the post, name, age, and distinction of sex are contained. Alternatively, only the ID number of the tag may be stored in the tag 802, and the information concerning the user 801 may be saved in a host computer (not illustrated) different from the label word processor 800. It is now assumed that the user 801 is making a label to be stuck on a file backbone in which research papers have been bound.

The user 801 inputs a character string "Research Paper File" from a keyboard 807. The character string is a character string to be printed on the label. Upon finishing in inputting the character string, the user 801 presses an "Issue" button 808. At this time, a label 805 having the character string printed thereon is output from the label word processor 800. At the same time, a reader 803 reads the information of the tag 802 carried by the user 801, and determines the person who has input the character string. Thereafter, the name of the user 801 and the name of the actual object are saved in the tag 804. These kinds of information is linked with the ID number of the tag. Alternatively, a list representing relations among the ID number, the name of the user 801, and the actual object name may be saved in the above described host computer, and only the ID number may be stored in the tag.

The user 801 sticks the label 805 on the file, and attaches the tag 804 as well to the file. Alternatively, the label 805 having the tag 804 attached thereto may be output.

Tags issued as heretofore described are attached to (stuck on) actual objects desired to be managed, respectively. Initialization in the present invention is thus finished.

Upon finishing the initialization, i.e., reader installation and tag issue, the user can utilize the system using the present invention. The user can inquire about information concerning an actual object. Inquiry about information concerning an actual object having a tag 110 attached thereto will now be described.

For inquiry about information concerning an actual object, an interface using a computer can be used. The computer can handle not only simply computer information but also the information concerning the actual object.

Prior to describing details, a summary of the inquiry about the information concerning an actual object will now be described. FIGS. 27A and 27B show a screen requiring a search for an actual object. In a room 2702, a user 2704 is using a word processor 2703. On the other hand, a user 2706 looking for the word processor 2703 which should usually be in a room 2705 is in the room 2705. It is now assumed that the word processor 2703 has a tag 110 attached thereto.

The word processor 2703 is being used by the user 2704 in a room 2702. It is now assumed that the room 2702 has a reader 109 installed therein, and the user 2704 is carrying a tag 110. The reader 109 reads contents of the tag 110 carried by the user 2704 and the tag 110 attached to the word processor 2703, and transmits the data thus read to the host computer 100. The data are stored in an ID buffer 108 included in the host computer 100. Processing conducted thereafter is the same as that described before by referring to FIG. 1. In the case of FIGS. 27A and 27B, the fact that the user 2704 was present together with the word processor 2703 is stored in the object state data base 106.

By using the inquiry means 104, the user 2706 can inquire where the word processor 2703 is. At this time, not only a search method informing that "the user is looking for the word processor 2703" is used, but also the fact that "it is usually in the room 2705" may be used as a key. The inquiry means 104 will be described later.

As for the fact "it is usually in the room 2705," the user may specify it as an attribute of the word processor 2703, or the host computer 100 may learn it. For this, the length of time over which the word processor 2703 has been placed in the room 2705, for example, can be used. This learning will be described later.

Figure 4A:
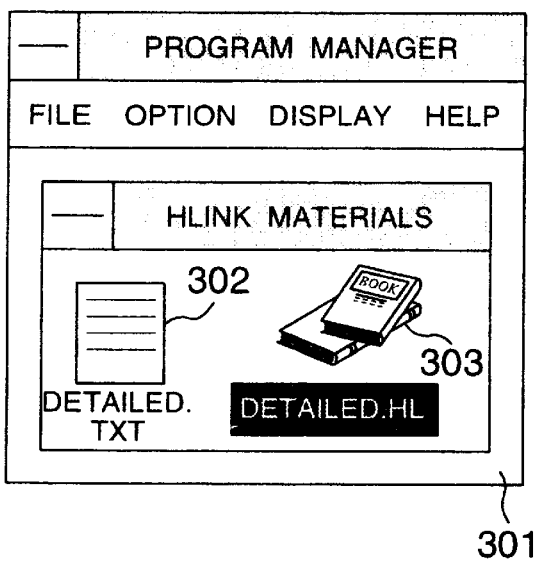
FIGS. 4A–4C show a series of manipulations for referring to actual object information.

Inquiry about information concerning an actual object will now be described in a little more detail. In FIG. 4A, a main window 301 for manipulating the host computer 100 is shown.

Figure 4B:
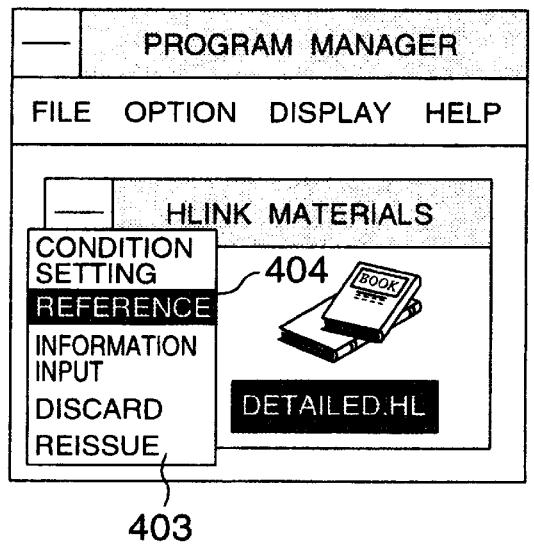
Figure 4C:
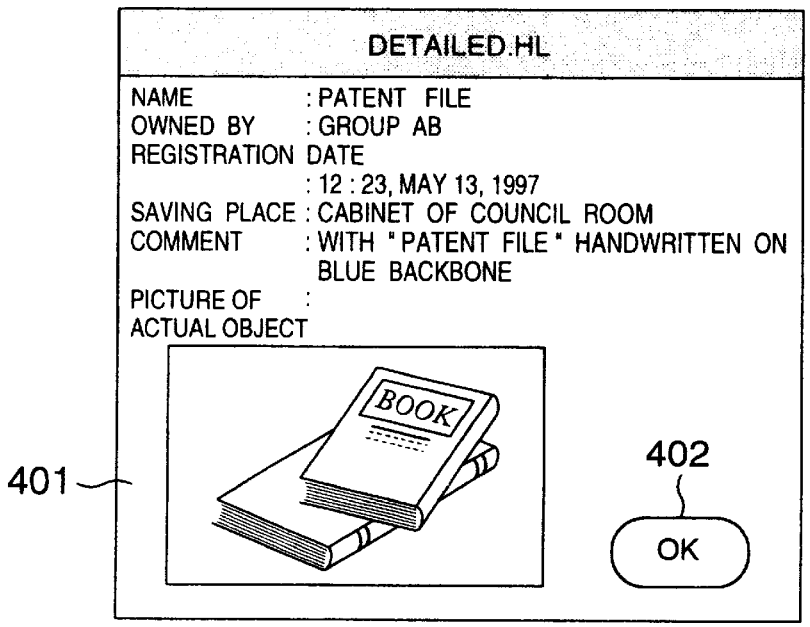

If the user puts a mouse cursor upon an actual object icon 303 of the window 301 and clicks the right button of the mouse, then a menu 403 is displayed and the user can select manipulation for the actual object information. This is shown in FIG. 4B. For referring to information concerning the actual object, a "Reference" menu 404 should be selected. Upon selecting the "Reference" menu 404, an actual object information browser 401 shown in FIG. 4C is displayed. Alternatively, the actual object icon 303 may be double-clicked to display the actual object information browser 401.

The actual object information browser 401 displays information concerning the actual object. FIG. 4C shows an example in which the actual object information browser 401 displays information concerning a patent file. By watching the actual object information browser 401, the user recognizes that this patent file is owned by a group AB and saved in a cabinet of a council room. Not only the information concerning the owner and place but also information concerning the actual object may be stored as a comment. This comment helps the user to call to mind, and facilitates the search for the actual object. Furthermore, not only the information concerning the owner and the saving place but also the picture of the actual object may be displayed. The actual object information browser 401 can be closed by clicking an "OK" button 402.

By using the icon indicating the information concerning an actual object, the actual object can be searched for with a conventional user interface handling a computer, as heretofore described.

Figure 29A:
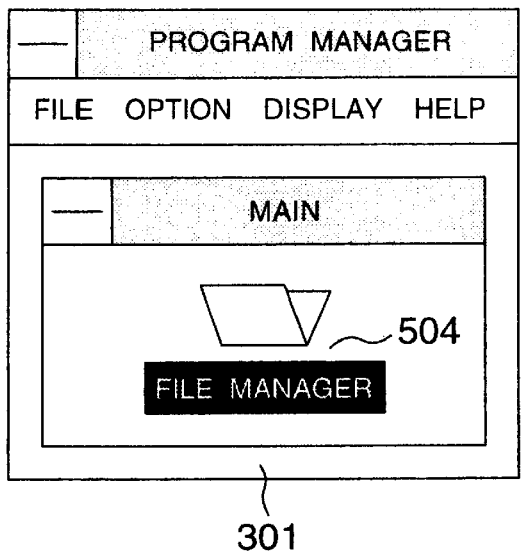
FIGS. 29A–29D show a series of manipulations for referring to information concerning an actual object.
Figure 29B:
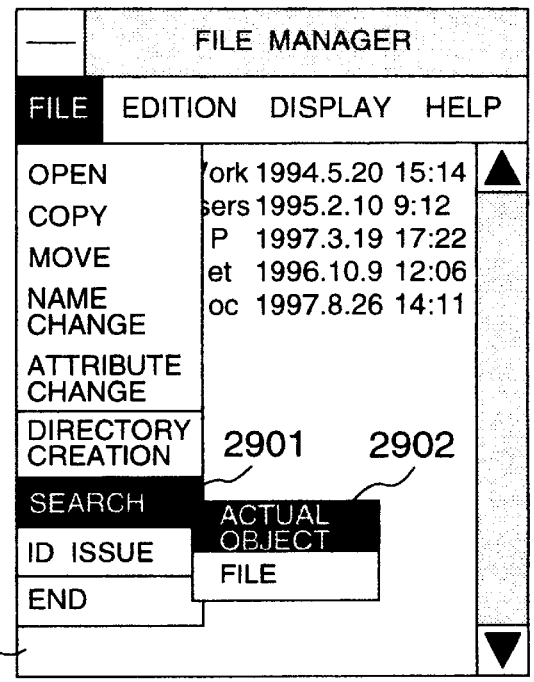

A method for referring to an actual object without using the actual object icon will now be described. FIGS. 29A–29D show the change of the screen in that procedure. First of all, the user double-clicks an icon 504 displayed in the window 301 shown in FIG. 29A. Thereupon the window 501 shown in FIG. 29B is displayed. The window 501 is a user interface for handling an electronic file. By selecting a "Search" menu 2901 in the window 501, a sub-menu 2902 furthermore appears. From the sub-menu 2902, either "Actual Object" or "File" can be selected. Thus both the actual object and the electronic file can be searched for.

Figure 29C:
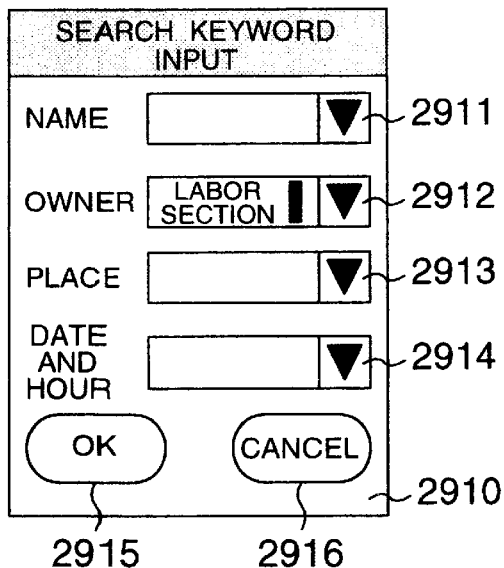

For referring to the information concerning the actual object, the user selects the actual object search menu 2902. At this time, an actual object search window 2910 as shown in FIG. 29C is displayed. A name field 2911 is a field for inputting the name of the actual object in question. An owner field 2912 is a field for inputting the owner of the actual object. A place field 2913 is a field for inputting the storage place of the actual object. A date and hour field 2914 is a field for inputting the date and hour when the tag 110 attached to the actual object was issued. It is not necessary to input all of these kinds of information, but it suffices to input any one of these kinds of information.

When the user has clicked a search start button 2915, the host computer 100 searches for information of the actual object by using the information input in the window 2910 as a key. If the user clicks a "Cancel" button 2916, the window 2910 disappears.

Figure 29D:
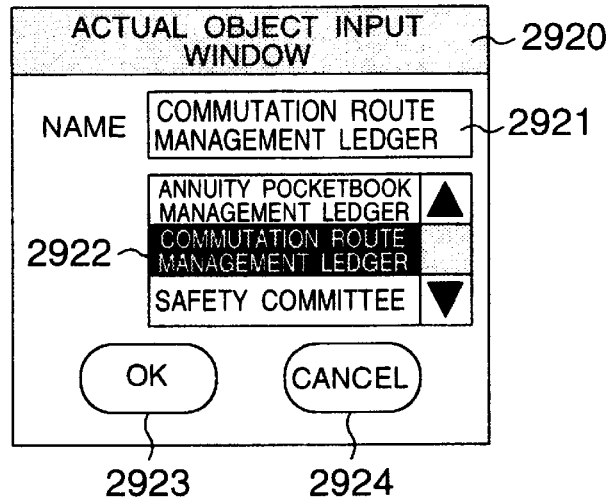

A result of search is displayed in an actual object selection field 2922 of a search result window 2920 shown in FIG. 29D. Names of actual objects are displayed in the actual object selection field 2922. If the user selects the desired actual object name from the actual object selection field 2922, the name of the actual object is displayed in a name field 2921. If thereafter the user clicks an "OK" button 2923, then the actual object information browser 401 is started, and information concerning the actual object displayed in the name field 2921 is displayed. If a "Cancel" button 2924 is clicked, the window 2920 disappears.

The search for an actual object will be furthermore described by referring to FIG. 10. As means for inputting search conditions for searching for an actual object, a search condition input window 1001 may be displayed instead of the actual object search window 1000. In the window 1001, history of access to the actual object can be input as a search key, instead of the attribute of the actual object desired to be searched for.

In the window 1001, the user inputs search items to fields 1002 and inputs subjects of the search items to fields 1003. In an example shown in FIG. 10, "together with" has been input to a first field 1002, and "Mr. Sato" has been input to a first field 1003. By the two inputs, a condition "together with Mr. Sato" is expressed. This is referred to as condition 1. Furthermore, "the time" has been input to a second field 1002, and "12:00 to 13:00" has been input to a second field 1003. By the two inputs, a condition "between 12:00 and 13:00" is expressed. This is referred to as condition 2. A field 1004 indicates a number of a search condition.

Upon finishing in inputting the search conditions, the user inputs how to combine those search conditions (condition expression) to a field 1005. In the example of FIG. 10, "1*2" has been input. Therefore, a logical product of the condition 1 and the condition 2 is expressed. In other words, the condition "it was present together with Mr. Sato between 12:00 and 13:00" is expressed.

Finally, the user clicks an "OK" button 1006. Thereupon, an actual object and a person conforming to the input conditions are searched for. A result of the search is displayed in an actual object selection field 1012 of a search result window 1010 shown in FIG. 29D. The name of an actual object is displayed in the actual object selection field 1012. If the user has selected a desired actual object name from the actual object selection field 1012, the name of the actual object is displayed in a name field 1011. If thereafter the user clicks an "OK" button 1013, then the actual object information browser 401 is started, and information concerning the actual object displayed in the name field 1011 is displayed. If a "Cancel" button 1007 is clicked, then the window 1001 disappears and the processing is finished without executing the search.

Figure 17A:
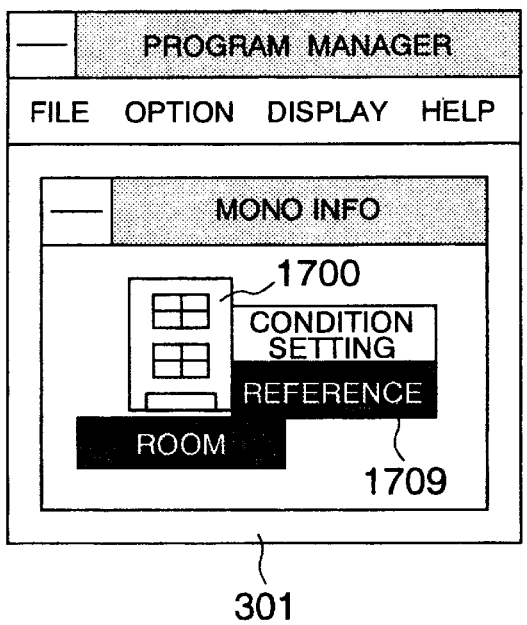
FIGS. 17A–17C show a series of manipulations for referring to information concerning a place.
Figure 17B:
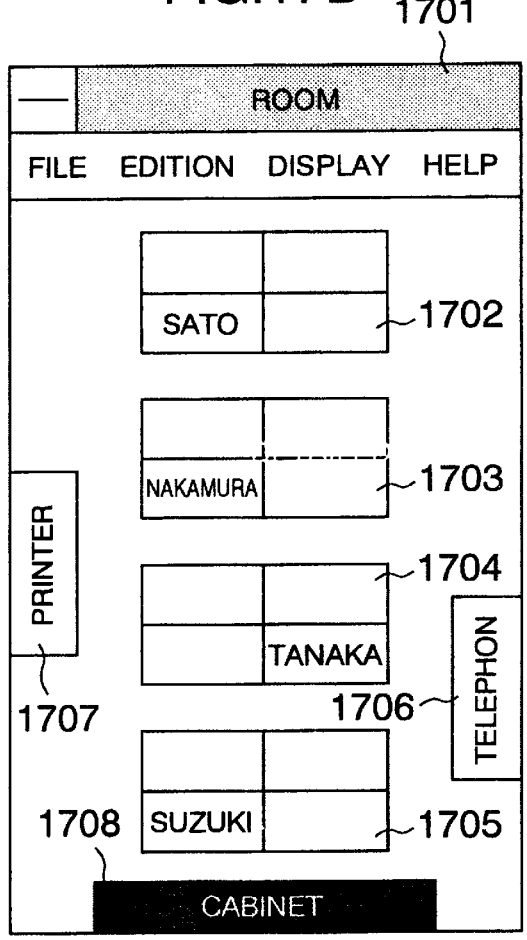
Figure 17C:
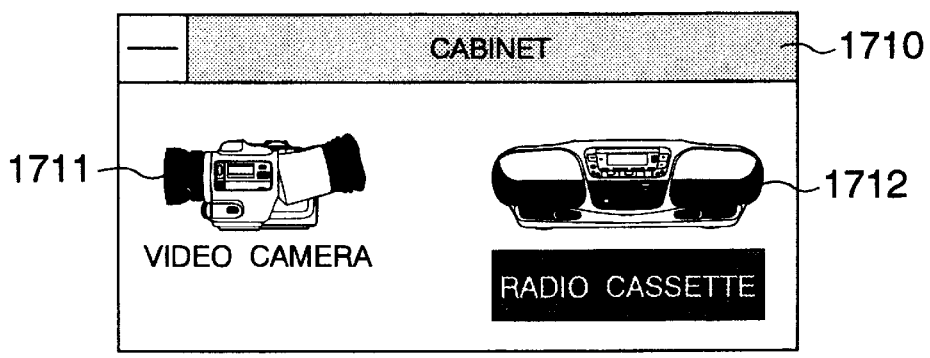

Besides the foregoing description, it is also possible to specify an arbitrary place in a displayed map of a room and obtain information relating to an actual object existing in that place. FIGS. 17A–17C show a change of the screen in that procedure.

A room icon 1700 is linked with information relating to a certain room. The room icon 1700 is made in accordance with the procedure shown in FIGS. 19A–19B, 20A–20B and 21A–21B.

First of all, if the user double-clicks the room icon 1700, a window 1701 indicating a layout of a place represented by the room icon 1700 appears. The window 1701 is equivalent to the window 2001 of FIG. 20A. Or after putting the mouse cursor upon the icon 1700 and clicking the right button to display a menu, a reference menu 1709 may be selected. In this case as well, the window 1701 appears in the same way as the foregoing description (FIG. 17B). The window 1701 shows a layout of a room of a company. In a group of seats 1702 to 1705, names of persons having seats therein are displayed. In this office room, there are also a telephone set 1706, a printer 1707, and a cabinet 1708.

In the case where the user wants to know an actual object exiting in that place, the user specifies the location. For example, the user specifies an arbitrary portion of the cabinet 1708. Thereupon, a window 1710 appears. Icons 1711 and 1712 representing actual objects stored in the cabinet 1708 of the office room are displayed in the window 1710 (FIG. 17C). If the user double-clicks the icon 1711 or the icon 1712, the user can see information relating to the actual object indicated by the icon as described above.

In the same way, by clicking an arbitrary place of the group of seats 1702 to 1705, an icon indicating an object existing in that place is displayed in the window 1710.

Figure 18A:
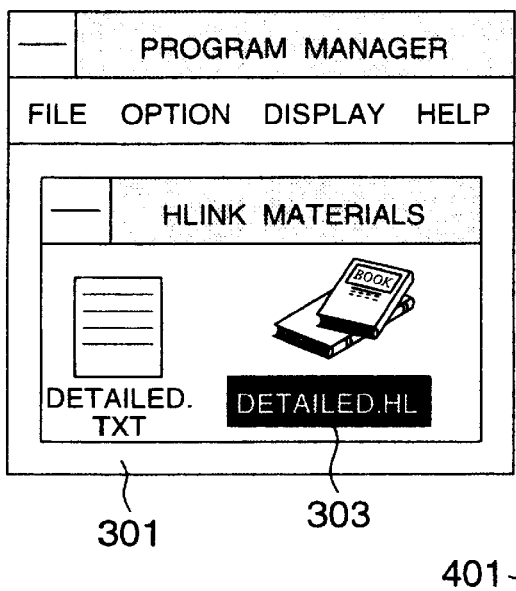
FIGS. 18A–18C show a display of a specified place on a layout diagram.
Figure 18B:
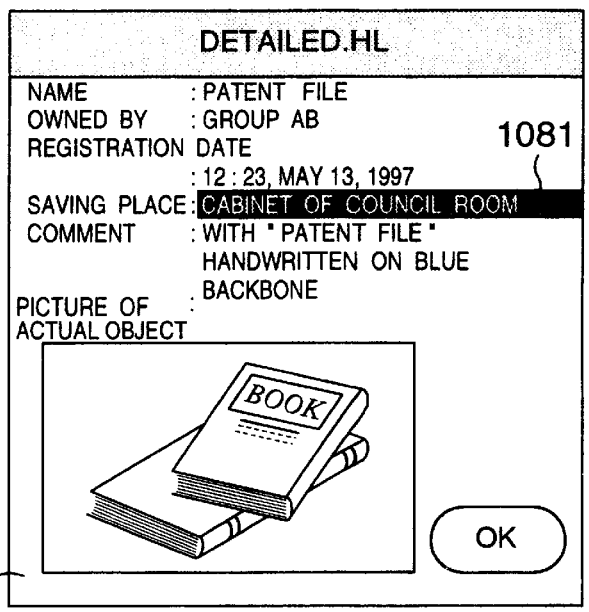
Figure 18C:
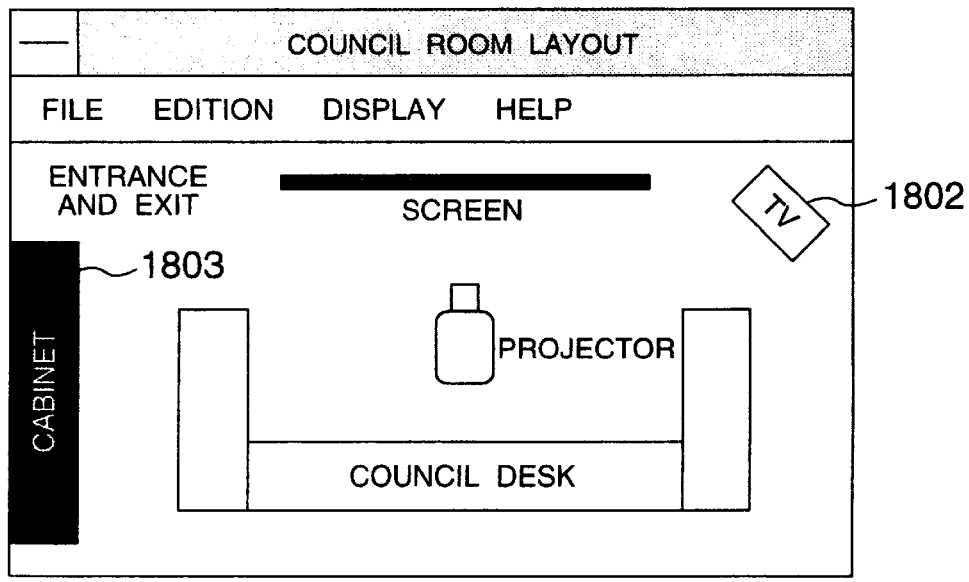

Furthermore, it is also possible to specify arbitrary information of the window 401 for displaying information relating to an actual object and cause a display of information relating thereto. FIGS. 18A–18C show an example thereof. FIGS. 18A–18C show an example in which a map indicating the position of an actual object looked for is displayed. By watching the window 401, it is known that the patent file is in a cabinet of a council room. Unless the position of the cabinet is known, the user cannot access the actual object.

By using the icon 303 included in the window 301, the user opens the window 401 (FIG. 18B). This was described before with reference to FIGS. 4A–4C. In this window 401, it is indicated that a patent file is saved in a cabinet of a council room.

Unless the user knows where the cabinet is, the user cannot access the patent file. In order to find out the position of the cabinet, the user clicks a character string "Cabinet in Council Room" of the window 401. Thereupon, a window 1802 shown in FIG. 18C is opened. The window 1802 indicates the layout of the council room. A cabinet 1803 disposed therein is indicated with reversal. By doing so, the user can know the location of the cabinet, and access to the actual object being looked for is facilitated.

If the user clicks an arbitrary place on the window 1802, an icon of an actual object existing in that place is displayed in a different window.

Processing for reissuing a tag 110 will now be described. When an issued tag 110 has become unusable, a tag replacing this is reissued by this processing.

Figure 12A:
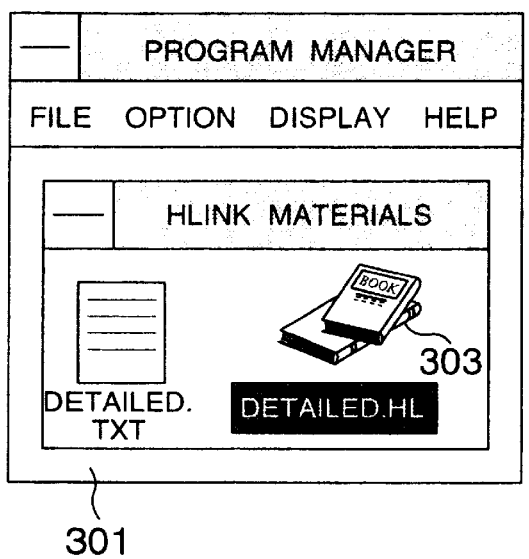
FIGS. 12A–12C show a series of manipulations for reissuing an identifier given to an actual object.
Figure 12B:
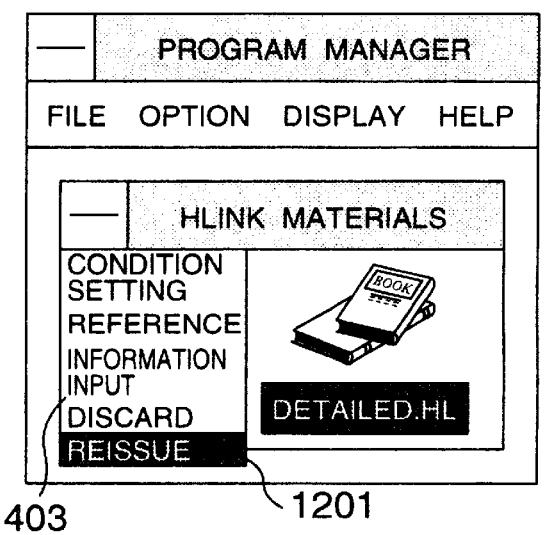

The user puts the mouse cursor upon the icon 303, and clicks the right button. Thereupon, the menu 403 is displayed (FIG. 12B). This is the same as the case of FIG. 4B and FIG. 9B. At this time, the user selects a "Reissue" menu 1201 from the menu 403.

Figure 12C:
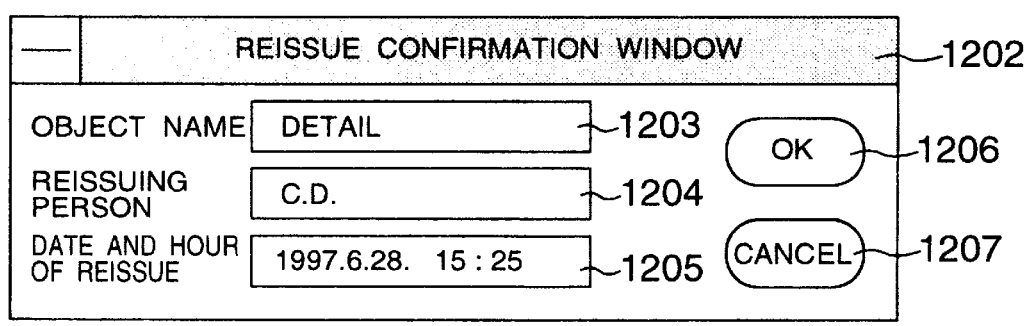

If the user has selected the menu 1201, a confirmation window 1202 is displayed (FIG. 12C). In a field 1203, the name of an actual object of a subject of reissue of a tag is displayed. The name of the actual object is obtained by referring to the object state data base 106. In a field 1204, a reissuing person is displayed. The reissuing person can be determined by reading information of a tag 110 carried by a person conducting the manipulation for the reissue. In a field 1205, the date and hour at that time is displayed.

If the user clicks an "OK" button 1206, the host computer 100 searches for a free ID number, links the ID number with the related information of the actual object, and stores a result thereof in the object state data base 106. As for the information, information provided with the old ID number is used as it is. The information displayed in the window 1202 is also linked with the ID number and stored in the object state data base 106. At the same time, a tag 110 having the ID number is issued. Furthermore, the host computer 100 disconnects the link between the old ID number and the actual object information. However, the host computer 100 leaves the fact that the old ID number has been made invalid on history. The history contains at least the person who has made the old ID number invalid and the date and hour thereof. If a "Cancel" button 608 is clicked, the processing is discontinued.

Figure 15:
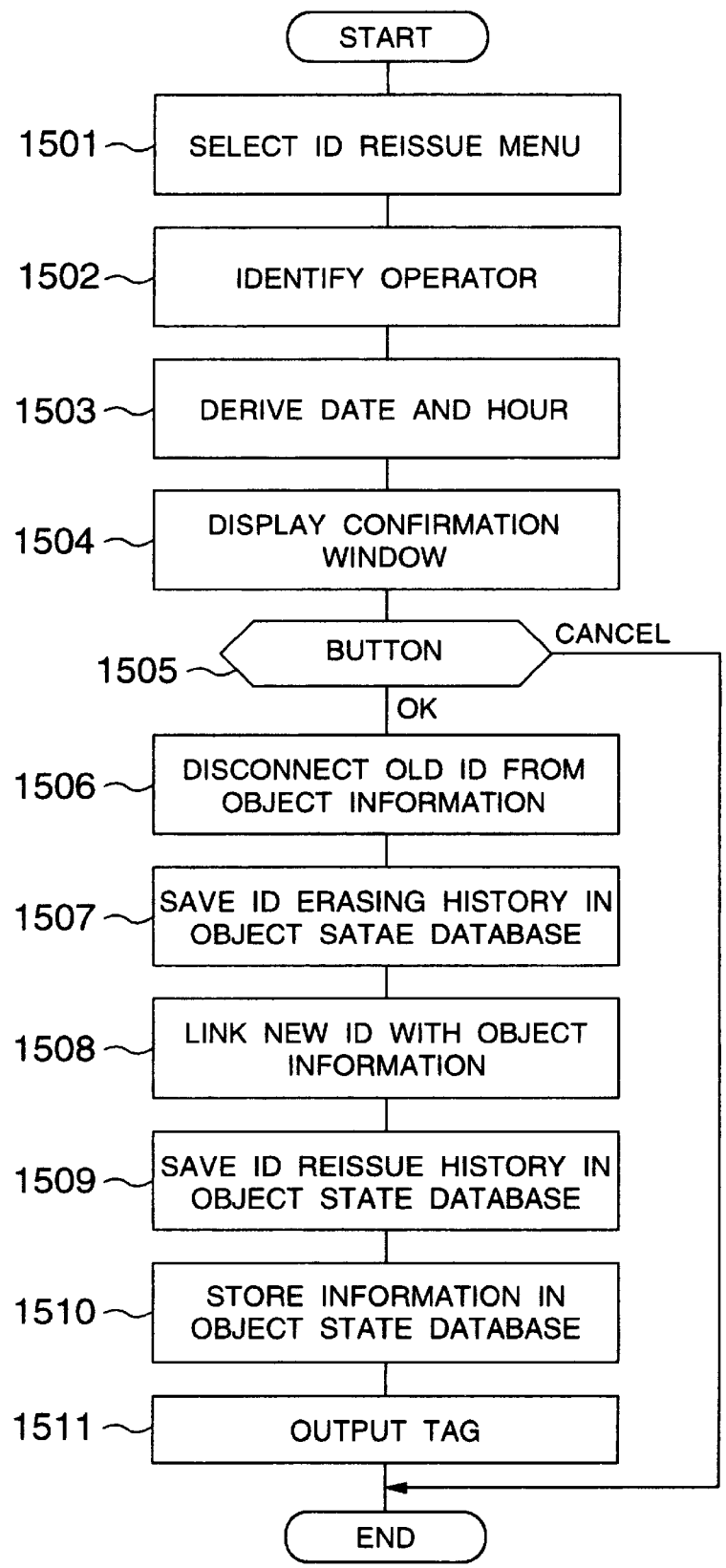
FIG. 15 is a flow chart showing a procedure for reissuing an identifier given to an actual object.

The flow of this processing will now be described again by referring to a flow chart of FIGS. 15A–15C. First of all, the user puts the mouse cursor upon the icon representing the actual object desired to be reissued, and clicks the right button to cause a display of the menu 403. The user selects the ID reissue menu 1201 from the menu 403 (Step 1501). Subsequently, the host computer 100 reads the tag 110 carried by the user, and identifies the user (Step 1502). Subsequently, the host computer 100 derives the date and hour at that time point (Step 1503). Upon finishing this, the confirmation window 1202 is displayed, and the object name, user name, and date and hour are displayed (Step 1504). At this time, the user clicks the "OK" button 1206 or the "Cancel" button 1207 (Step 1505). If the "Cancel" button 1207 is clicked, the processing is finished without conducting anything.

If the "OK" button 1206 is clicked, the link between the ID number of the tag 110 attached to the actual object in question and the related information of the actual object is disconnected (Step 1506). Subsequently, the history of the step 1506 is saved in the object state data base 106 (Step 1507). In the history, information representing when, who conducted the procedure of the step 1506 is contained. Subsequently, the host computer 100 searches for an unused ID number, and links the related information of the actual object with the ID number (Step 1508). At this time, the ID number issuer is not an issuer of the old ID number, but a person who reissued the ID number. Furthermore, the date and hour of issue becomes the date and hour of the reissue in the same way. This information is stored in the object state data base 106 (Step 1510). Finally, a tag 110 having the ID number attached thereto is output (Step 1511), and the procedure of tag issue is finished.

The condition setting means 102 will now be described. The condition setting means 102 is a user interface for the user to set processing of starting according to the situation of the actual world. In other words, the condition setting means 102 is means for setting conditions in starting certain processing.

The user looks for the room or place icon 1700 in the window 301. Subsequently, the user puts the mouse cursor upon the icon 1700, and presses the right button of the mouse. Thereupon, a start menu 2201 appears (FIG. 22B). Subsequently, the user selects "Set conditions" in the start menu 2201. Thereupon, a window for setting conditions 2202 appears (FIG. 22C). The window 2202 is a user interface for setting conditions and processing to be started when the conditions are satisfied.

Figure 22A:
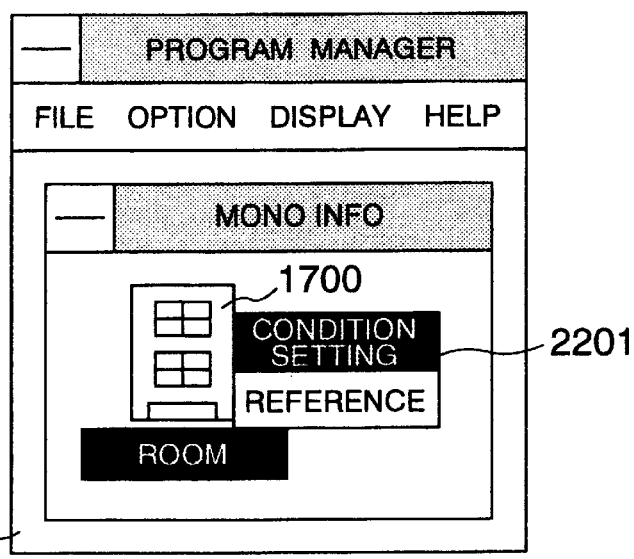
FIGS. 22A and 22B show a series of manipulations for inputting a start condition of processing.
Figure 22B:
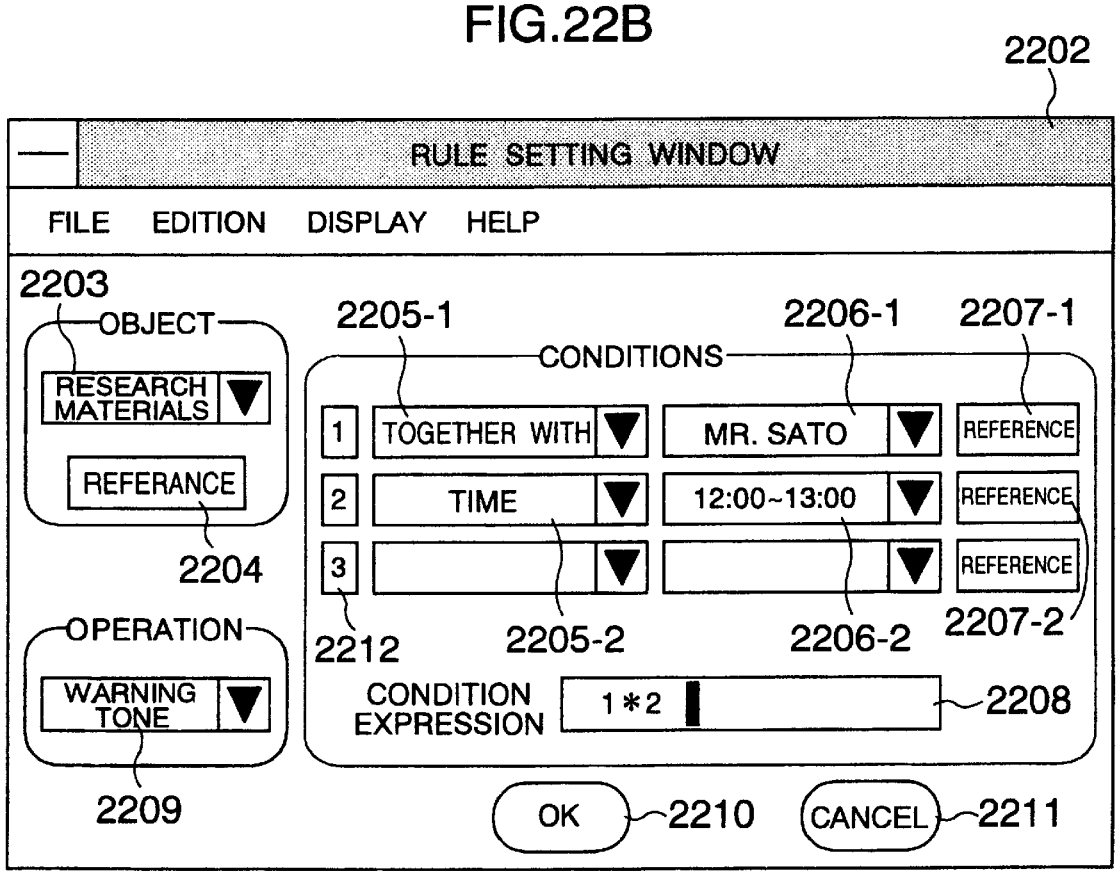

In the example of FIGS. 22A and 22B, it is assumed that conditions for a room in a company are set. As for condition setting for a place, conditions such as "a person cannot enter the room unless the person carries a certain object", "a person cannot enter the room if the person carries a certain object", and "a person cannot enter the room for a certain time period" are conceivable. FIG. 22B shows an example of condition setting for the case where "When Mr. Sato enters an office room, he must have research materials. In addition, the time should be between 12:00 and 13:00. If the condition is violated, a warning tone is issued." This will now be described.

First of all, in an object setting field 2203, the user specifies "Research Materials." At the time of this specification, the user may directly input "Research Materials" by means of the keyboard or the like. Or the user may click a "Reference" button 2204 to cause a display of an object list (not illustrated), and conduct a selection from the object list.

Subsequently, the user inputs "Mr. Sato" to a field 2206. As for this as well, the user may directly input it by means of the keyboard or the like, or the user may click a "Reference" button 2207-1 to cause a display of a person list (not illustrated), and conduct a selection therefrom. Subsequently, the user inputs conditions concerning "Mr. Sato." As for this, the user inputs a condition "together with" to a field 2205-1. For inputting this condition, the user clicks a button located at the right end of the field 2205-1 to cause a display of a pull-down menu and conduct a selection therefrom. As a result, inputting the condition "together with Mr. Sato" as a condition for "Research Materials" has been finished. This condition "together with Mr. Sato" is referred to as condition 1. By the way, the input order of the field 2206-1 and the field 2205-1 may be reversed from that of the foregoing description.

Subsequently, the user inputs a condition "between 12:00 and 13:00." For achieving this, the user inputs "between 12:00 and 13:00" to a field 2206-2. Then the user inputs "time" to a field 2205-2. As for the input to the field 2205-2, the user clicks a button located at the right end of the field 2205-2 to cause a display of a pull-down menu and conducts a selection therefrom. This condition "the time should be between 12:00 and 13:00" is referred to as condition 2. By the way, a field 2212 indicates a condition number.

Subsequently, the user inputs a relation between the condition 1 and the condition 2 to a field 2208 in the form of a logical expression. In this case, entrance into the room is permitted when both the condition "together with Mr. Sato" and the condition "the time should be between 12:00 and 13:00" are satisfied. Therefore, "1*2" is input to the field 2208.

Finally, the user inputs operation to be conducted when the above described specified conditions are satisfied to a field 2209. Here, "Warning Tone" is input. This is conducted by clocking a button located at the right end of the field 2209 to cause a display of a pull-down menu and conducting a selection therefrom.

After finishing in inputting the conditions and operation, the user clicks an "OK" button 2210. Thereupon, the conditions and the operation are linked up together and stored in the condition data base 105, and the window 2202 disappears. If a "Cancel" button 2211 is clicked, then the condition and operation setting is discontinued, and the window 2202 disappears.

Figure 23:
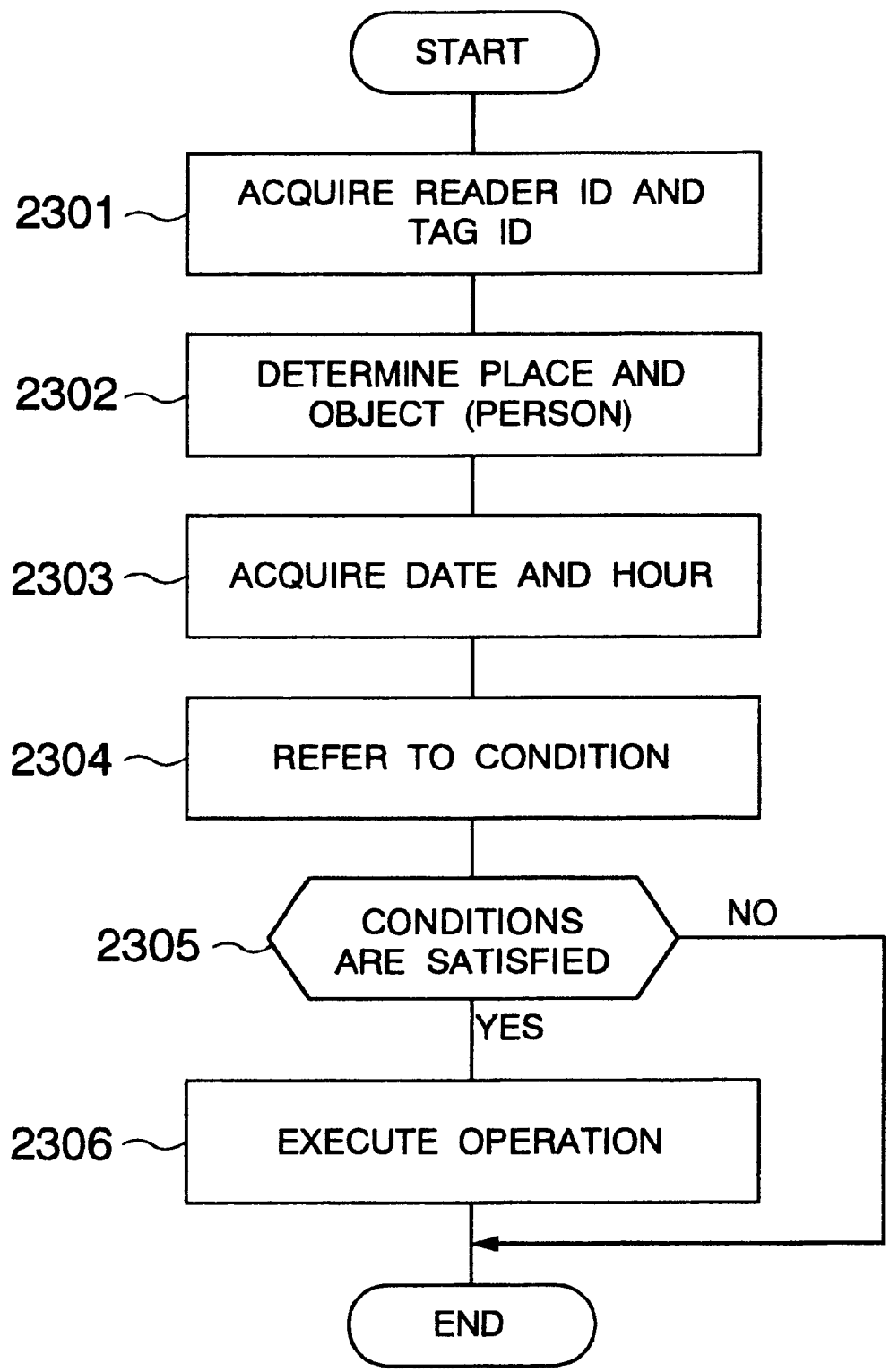
FIG. 23 is a flow chart showing a procedure for starting processing.

The conditions thus set are referred to by the state monitor means. Operation of the state monitor means will now be described by referring to FIG. 23. Upon receiving the information of the tag 110 and the information of the reader 109 which has read the information, the state monitor means 107 judges the situation of the actual world. At the same time, the state monitor means 107 determines whether it is necessary to start any processing according to the situation.

Upon reading the information of the tag 110, that information and information of the reader 109 which has read that information are sent to the ID buffer 108. At step 2301, the state monitor means 107 reads the information stored in the ID buffer 108. In this information, at least the ID number of the tag 110 and the ID number of the reader 109 which has read the tag are contained. Subsequently, by using the ID number of the tag 110 and the ID number of the reader 109 as a key, the state monitor means 107 refers to the object state data base 106, and determines where what is present (Step 2302). Subsequently at step 2303, the state monitor means 107 acquires the current date and hour. Then the state monitor means 107 refers to the condition data base 105

(Step 2304), and determines whether the current situation satisfies the conditions described in the condition data base 105 (Step 2305). If the current situation satisfies the conditions, the operation linked with the conditions is executed (Step 2306).

The conditions stored in the condition data base 105 are not restricted to the conditions input by the user by using the condition setting means 102. For example, there can be considered such a method that the "normal state" of the actual object is learned and some processing is started when a situation widely different from the normal state. This method will now be described.

FIG. 24A shows a table 2401 showing history of approaches conducted between objects, approaches conducted between persons and objects, and approaches conducted between objects or persons and readers. In the table 2401, for example, a cell 2402 indicates that approaches were conducted between ID1 and ID3 ten times. Assuming, for example, that ID1 is a "book" and ID3 is "Mr. Kimura", the cell 2402 means "Mr. Kimura accessed the book ten times." Assuming that ID1 is a "office room" and ID3 is a "file", the cell 2402 means that a reader 109 installed in the office room read the "file" ten times. The IDs includes not only the ID numbers of the tags 110 attached to objects and persons, but also ID numbers attached to the readers 109.

As for the data of the table 2401, it is necessary to save not only the number of times of approaches conducted between objects, approaches conducted between persons and objects, and approaches conducted between objects or persons and readers, but also their date and hour and time. A table 2404 shown in FIG. 24B shows the occurrence date and hour and occurrence time of a cell 2403.

Data storage in the table 2401 will now be described a little more. For example, it is now assumed "Mr. Suzuki passed through an entrance and exit of while carrying a reference book." Mr. Suzuki carries a tag 110, and a tag 110 is attached to the reference book. Furthermore, a reader 109 is installed in the entrance and exit. It is now assumed that ID numbers of Mr. Suzuki, the reference book, and the entrance and exit of the council room are 10, 20 and 30, respectively. First of all, since Mr. Suzuki is present together with the reference book, a (10, 20) component of the table 2401 is increased by an increment. Subsequently, since Mr. Suzuki was read by the reader 109 installed in the entrance and exit, a (10, 30) component of the table 2401 is increased by the increment. Furthermore, since the reference book was read by the reader 109 installed in the entrance and exit, a (20, 30) component of the table 2401 is increased by the increment. In this way, the relations among at least three things, i.e., object, person and place are resolved into relations between two things, and stored in the table 2401.

In the table 2401 thus obtained, portions having large values should be regarded as the "normal state." For example, if the frequency of using the "reference book" is the highest in the case of "Mr. Suzuki", the system may be set so as to prevent persons other than "Mr. Suzuki" from accessing the "reference book." In some actual objects, however, the access frequency is high only for a period, but since then there are no access at all. It is not necessarily appropriate to use a temporary access frequency permanently. Therefore, history records which elapsed a fixed time may be deleted.

Figure 25:
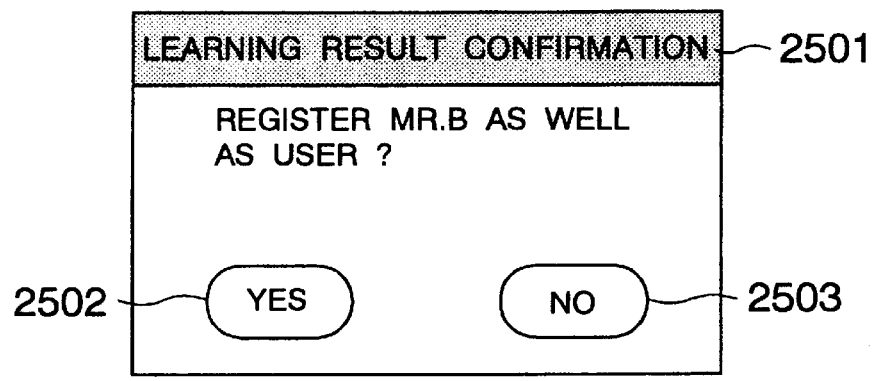
FIG. 25 shows a window informing the user that a state different from a normal state of an object has occurred.

Furthermore, if a situation different from the "normal state" frequently occurs, the user may be informed of it. For example, in the case where an object frequently used by Mr. A is used by Mr. B, the window 2501 of FIG. 25 may be displayed and an inquiry may be made whether Mr. B may become a user. If the user clicks a "Yes" button 2502, it can be set that warning is not given even if Mr. B approaches the actual object. If the user clicks a "No" button, such setting cannot be effected.

When implementing the table 2401, a two-dimensional arrangement of structures having the number of times of approach and the occurrence date and hour as members should be defined.

Finally, processing conducted when a tag 110 attached to an actual object has become unused will now be described. This processing becomes necessary in the case where it has become unnecessary to manage the actual object, such as the case where the actual object has been discarded and the case where the actual object has been transferred to someone. In such a case, it becomes necessary to invalidate an ID number when a tag having the ID number has become unused. By doing so, an actual object to which a tag having that ID number is attached is removed from the subjects of the search. Even if the tag is read by a reader 109, the host computer 100 does not start any processing.

Figure 9A:
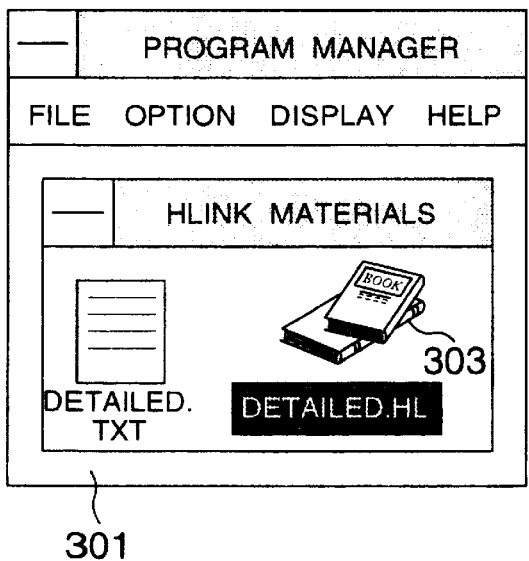
FIGS. 9A–9D show a series of manipulations for invalidating an identifier given to an actual object.
Figure 9B:
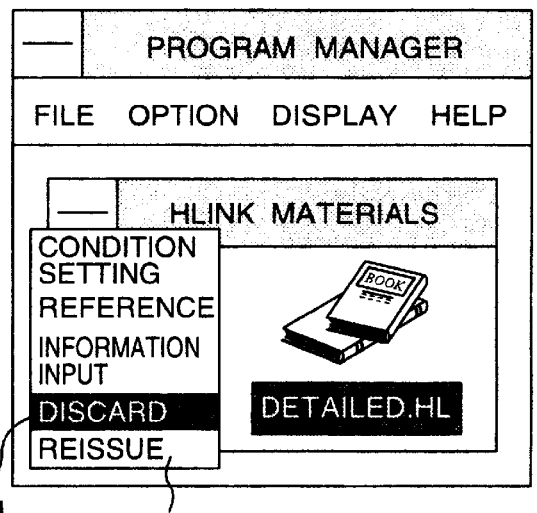

The user puts the mouse cursor upon the actual object icon 303 and clicks the right button of the mouse. Thereupon, the menu 403 appears (FIG. 9B). If a discard menu 901 is selected from the menu 403, the tag 110 attached to the actual object indicated by the actual object icon 303 can be invalidated.

Figure 9C:
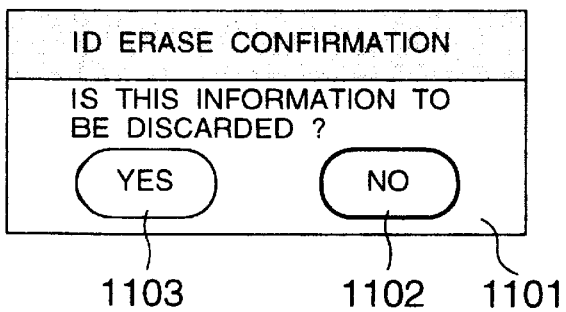

At this time, a reader 109 reads data of a tag 110 carried by the user who is conducting the manipulation for erasing the tag, and grasps the user who is conducting this manipulation. In the case where the user in question is permitted to conduct this manipulation, a confirmation window 1101 shown in FIG. 9C is displayed. If the user clicks a "Yes" button 1103, the ID number is removed from the subjects of the management. In other words, even if a reader 109 reads the ID number, the system side does not give any response. In the object state data base 106, however, the history record indicating that the user removed the ID number from the subjects of the management is left. If the user clicks a "Cancel" button 608, the ID number can be used as heretofore.

Figure 9D:
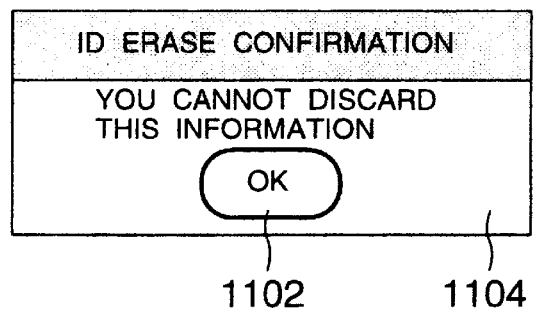

In some cases, only a certain specific person is permitted to erase the ID number of an actual object. If the user has not been permitted to erase the ID number, a window 1104 (FIG. 9D) appears and the user is informed that the user is not permitted to erase the ID. If the user clicks an "OK" button 1105, the window 1104 disappears. Alternatively, the information of the tag 110 carried by the user may be read when the right button of the mouse is clicked. In this case, the discard menu 901 is adapted so that users who are not permitted to erase the ID number may not select it. At this time, the discard menu 901 may be displayed with a half tone.

Figure 14:
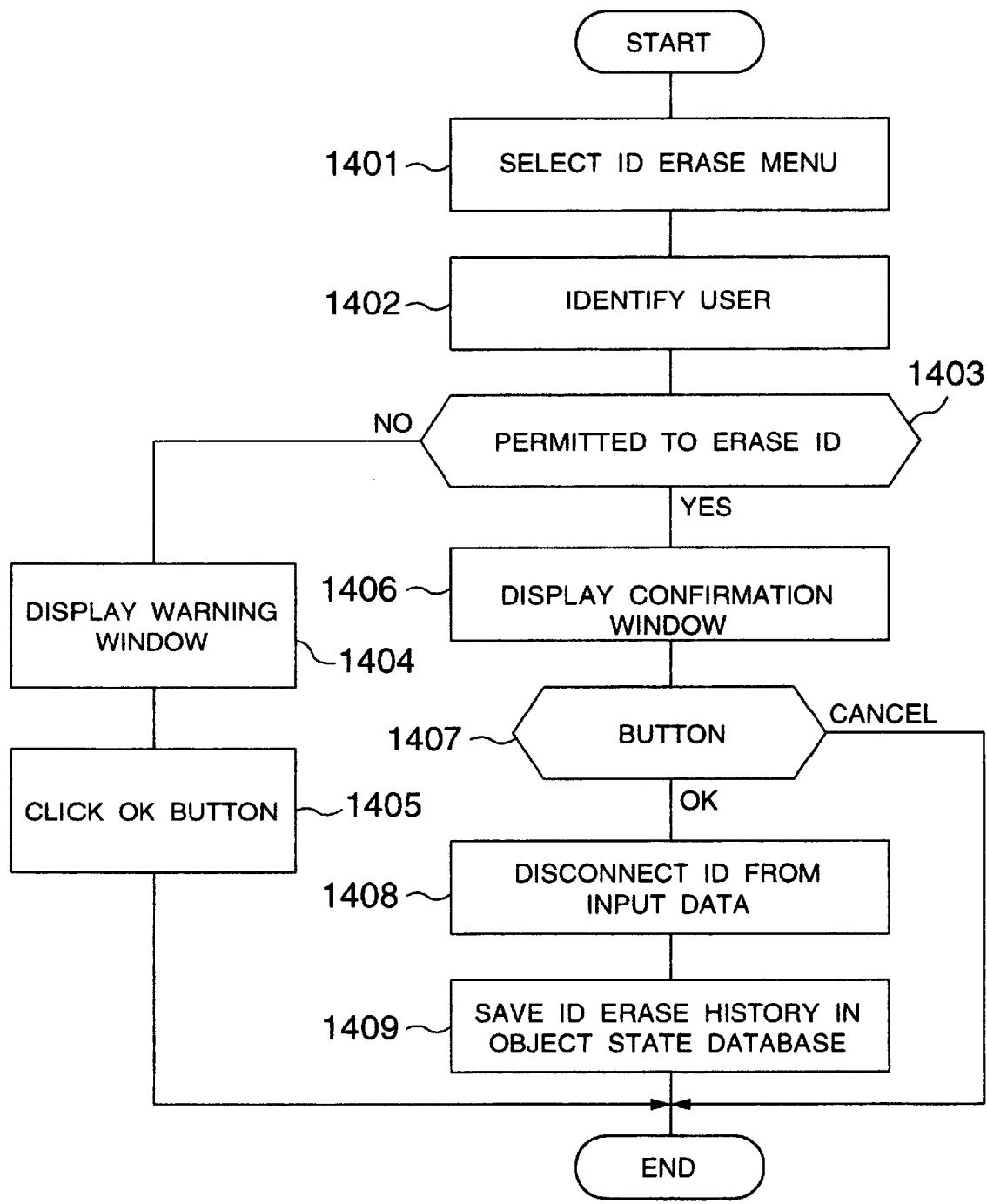
FIG. 14 is a flow chart showing a procedure for invalidating an identifier given to an actual object.

The procedure of this ID number erasing is shown in FIG. 14, and it will now be described again. The user puts the mouse cursor upon the actual object icon, clicks the right button, and selects the discard menu 901 from the menu 403 (Step 1401). Subsequently, the host computer 100 reads the tag carried by the user by means of the reader 109, and identifies the user (Step 1402). After identifying the user, the host computer 100 determines whether the user in question was permitted to erase the ID number (Step 1403). If the user was not permitted, then a warning window 1104 is displayed (Step 1404), and the user is informed that the ID number cannot be erased. The user clicks an "OK" button 1105 (Step 1405), and the processing is finished without erasing the ID number. If the user was permitted to erase the ID number, the confirmation window 1101 is displayed. If here the user clicks a "No" button 1102, the processing is finished without erasing the ID number. On the other hand, if a "Yes" button 1103 is clicked, then the link between the ID number and the related information of the actual object is disconnected (Step 1408), and its history record is saved in the object state data base 1106 (Step 1409).

When discarding a tag 110, it is also possible to specify the actual object itself to which the tag desired to be discarded is attached. This will now be described by referring to FIG. 26. For example, in the case where a tag 110 attached to a dictionary 2604 is to be discarded, a reader 109 buried in a disk 2601 reads the tag 110 attached to the dictionary 2604. Thereupon, the host computer recognizes that the dictionary 2604 has been placed on the disk 2601. In this case, a picture input device 2605 may be present or may not be present. If there is the picture input device 2605, the dictionary 2604 may be sensed by processing a picture obtained from the picture input device 2605.

Figure 28A:
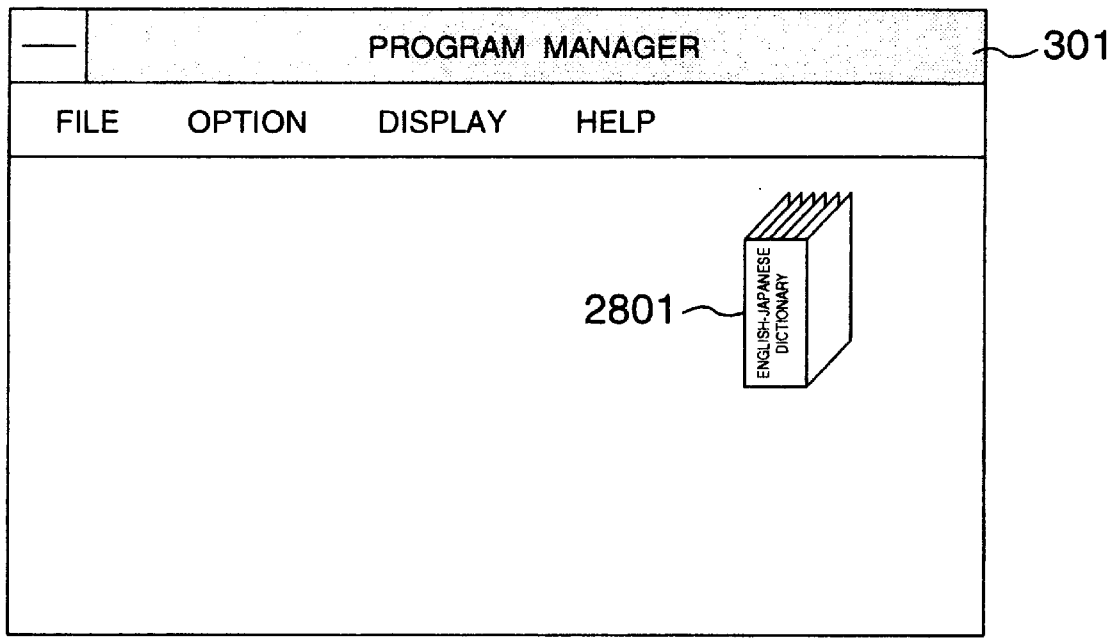
FIGS. 28A and 28B show a first manipulation for invalidating an identifier given to an actual object.
Figure 28B:
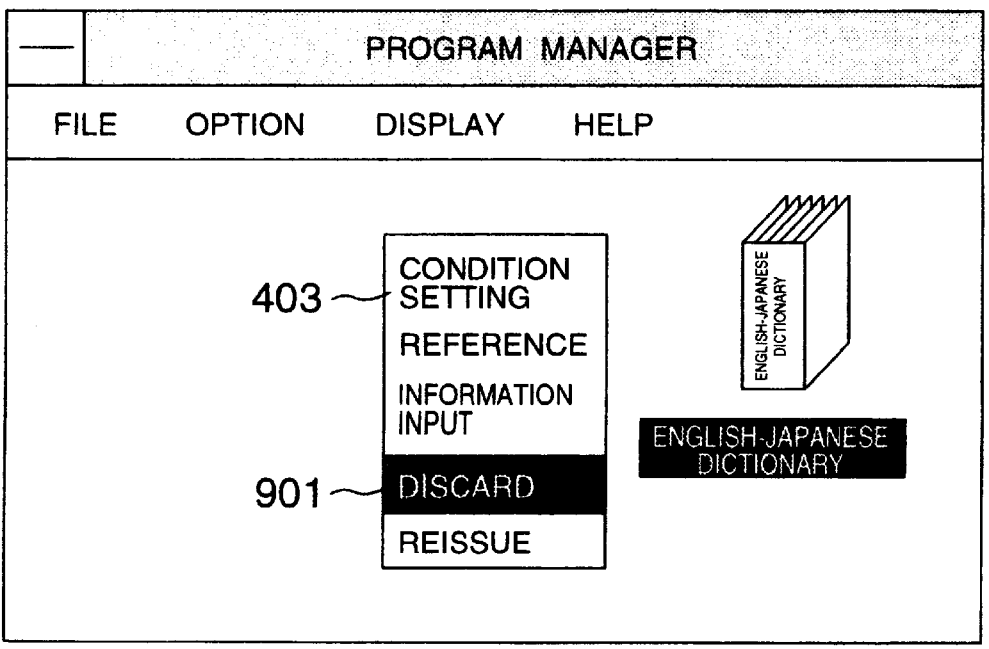

Subsequently, an icon 2801 representing the dictionary 2604 is displayed on a display 2606 (FIG. 28A). If there is the picture input device 2605, the position of the dictionary 2604 is known. Therefore, the display position on the display 2606 may be determined according to the position where the dictionary 2604 is placed. For example, in the case where the dictionary 2604 is placed at the right end of the disk 2601, the icon 2801 may be displayed at the right end of the display 2606.

Operation conducted after the icon 2801 has been displayed is the same as the foregoing description. The user puts the mouse cursor upon the icon 2801, and clicks the right button. Thereupon, the menu 403 appears. By selecting the discard menu 901, the tag can be discarded.

Furthermore, not only when discarding a tag, but also when referring to information concerning an actual object, such manipulation can be used. For example, when referring to information concerning the dictionary 2604, the user places the dictionary 2604 on the disk 2601, causes a display of the icon 2801, then causes a display of the menu 403, and selects "Refer." Thereupon, the object information browser 401 appears. Thus, information concerning the dictionary 2604 can be referred to.

What is claimed is:

1. An object management system comprising:
    a reading device capable of reading information stored in a card without contacting said card;
    a storage device;
    an input device for inputting information of an object to be managed and information as to an identifier of a user to be stored in relation to the object;
    a processing device for causing an identification number to be generated, storing the information of the object to be managed and the information concerning the object input from said input device in said storage device so as to be associated with each other, and reading the information of a related object from said storage device on the basis of an identification number read from said reading device;
    a card issue device for storing said identifying number in a card; and
    a display device for displaying the information relating to said object read out from said storage device.

2. An object management system according to claim 1, wherein said input device is an input device capable of inputting picture information as well as an object to be managed, and
    said processing device stores the information of the object to be managed, the information concerning the object, and the picture information of the object input from said input device in said storage device so as to be associated with each other.

3. An object management system according to claim 1, wherein said processing device stores information and an identification number read from said reading device in said storage device so as to be associated with each other.

4. An object management system according to claim 1, wherein said object management system comprises a plurality of reading devices, and stores reading devices and installation places thereof in said storage device so as to be respectively associated with, and
    when the information of said issued card is read by one of said reading devices, the information concerning the object and the installation place of said one of said reading devices are displayed on said display device.

5. An object management system according to claim 4, wherein said display device displays places where said plurality of reading devices are installed.

6. An object management system according to claim 1, wherein said input device comprises at least a picture reading device, and
    said processing device stores the picture read by said picture reading device and said identification number in said storage device so as to be associated with each other.

7. An object management system according to claim 1, wherein when information relating to an object is input from said input device, said processing device refers to said storage device, determines said object from the information relating to the said object, and displays said object on said display device.

8. An object management system comprising:
    a reading device capable of reading information stored in a card without contacting said card;
    a storage device;
    an input device for inputting information of an object to be managed and information concerning the object;
    a processing device for causing an identification number to be generated, storing the information of the object to be managed and the information concerning the object input from said input device in said storage device so as to be associated with each other, and reading the information of a related object from said storage device on the basis of an identification number read from said reading device;
    a card issue device for storing said identifying number in a card;
    a display device for displaying the information relating to said object read out from said storage device; and
    a printer for printing the information of said object to be managed on a label.

9. An object management system according to claim 8, wherein when information relating to an object printed on said label is input from said input device, said processing device refers to said storage device, determines said object from the information relating to the said object, and displays said object on said display device.

10. An object management system comprising:
    a reading device capable of reading information stored in a card without contacting said card;
    a storage device;
    an input device for inputting information of an object to be managed and information concerning the object;

a processing device for causing an identification number to be generated, storing the information of the object to be managed and the information concerning the object input from said input device in said storage device so as to be associated with each other, and reading the information of a related object from said storage device on the basis of an identification number read from said reading device;

a card issue device for storing said identifying number in a card;

a display device for displaying the information relating to said object read out from said storage device;

wherein said input device is an input device capable of inputting picture information as well as an object to be managed, and said processing device stores the information of the object to be managed, the information concerning the object, and the picture information of the object input from said input device in said storage device so as to be associated with each other; and a printer for printing the information of said object to be managed on a label.

11. An object management system according to claim 10, wherein when information relating to an object printed on said label is input from said input device, said processing device refers to said storage device, determines said object from the information relating to the said object, and displays said object on said display device.

12. An object management system comprising:

a reading device capable of reading information stored in a card without contacting said card;

a storage device;

an input device for inputting information of an object to be managed and information concerning the object;

a processing device for causing an identification number to be generated, storing the information of the object to be managed and the information concerning the object input from said input device in said storage device so as to be associated with each other, and reading the information of a related object from said storage device on the basis of an identification number read from said reading device;

a card issue device for storing said identifying number in a card;

a display device for displaying the information relating to said object read out from said storage device;

wherein said processing device stores information and an identification number read from said reading device in said storage device so as to be associated with each other; and a printer for printing the information of said object to be managed on a label.

13. An object management system according to claim 12, wherein when information relating to an object printed on said label is input from said input device, said processing device refers to said storage device, determines said object from the information relating to the said object, and displays said object on said display device.

14. An object management system comprising:

a plurality of reading devices for reading information stored in a card given to an object to be managed;

a storage device for storing processing contents for situations, said situations including identifier information as to reading-out of the information stored in said card;

a condition setting unit for setting processing to be executed according to a situation;

a state monitor unit for executing processing on the basis of information read from one of said reading devices and the contents set by said condition setting unit;

a management unit for managing identification numbers each stored in said card for managing said object to be managed; and a display means for informing of processing executed by said state monitor unit.

15. An object management system comprising:

a first medium for storing information, said first medium attached to an object to be managed;

a second medium for storing information, said second medium carried by a user;

a reading device capable of reading information stored in said first medium and said second medium without contacting said first medium and said second medium; and a processing device for executing processing on the basis of the information read from said first medium and said second medium by said reading device.

16. An object management system comprising:

an input device for inputting information to search for an object to be managed;

a processing device including a reading device for reading information stored in a first medium attached to said object to be managed, a storage unit for storing the information read from said first medium in association with the object and storing information relating to the information stored in said first medium, and a processing unit for determining the object to be managed having said first medium attached thereto on the basis of the information input from said input device for search and the relating information stored in said storage device, and for deriving a position of said determined object to be managed;

a second medium for storing information, said second medium carried by a user, said reading device making read-out of information from said first medium and said second medium without contacting said first medium and said second medium to associate the information read out from said first medium with the information stored in said second medium; and a display device for displaying the position of said object to be managed derived by said processing device.

17. An object management system comprising:

a medium for storing information;

a plurality of reading devices for reading the information stored in said medium without contacting said medium;

a position detecting device for detecting a position of said medium; and a processing unit for managing said plurality of reading devices by providing said plurality of reading devices with unique identification numbers, and for associating information supplied from said position detecting device with an identification number of a reading device, if a frequency of read-out of the information from said associated reading device is equal to or larger than a predetermined value.

18. An object management system comprising:

a medium for storing information;

a plurality of reading devices for reading the information stored in said medium without contacting said medium;

a position detecting device for detecting a position of said medium; and a picture input device for taking in a picture of a place where said plurality of reading devices are installed;

a processing unit for managing said plurality of reading devices by providing said plurality of reading devices with unique identification numbers, and for storing the picture input from said picture input device in association with a position of a reading device which read the information stored in said medium on the basis of information supplied from said reading device which read the information stored in said medium and from said position detecting device; and a display device for displaying positions of said plurality of reading devices in addition to said input picture.

19. An object management system comprising:

media for storing information, said media attached to objects to be managed;

a plurality of reading devices for reading the information stored in said media without contacting said media; and a processing device for managing whereabouts of said objects to be managed by providing said plurality of reading devices with individual identification numbers and associating the information stored in said media with the identification numbers, wherein if a frequency of read-out of information of different media from said reading devices is equal to or larger than a predetermined value, objects to be managed having said read media attached thereto are managed in association with identification numbers of said reading devices.

* * * * *